United States Patent
Gottschall et al.

(10) Patent No.: US 11,490,773 B2
(45) Date of Patent: Nov. 8, 2022

(54) FILTER SYSTEM FOR A VACUUM CLEANER

(71) Applicant: SHOP VAC CORPORATION, Williamsport, PA (US)

(72) Inventors: Jason Gottschall, South Williamsport, PA (US); Craig A. Seasholtz, Avis, PA (US)

(73) Assignee: SHOP VAC CORPORATION, Williamsport, PA (US)

( * ) Notice: Subject to any disclaimer, the term of this patent is extended or adjusted under 35 U.S.C. 154(b) by 536 days.

(21) Appl. No.: 16/668,082

(22) Filed: Oct. 30, 2019

(65) Prior Publication Data

US 2020/0129022 A1  Apr. 30, 2020

Related U.S. Application Data

(60) Provisional application No. 62/752,743, filed on Oct. 30, 2018.

(51) Int. Cl.
*A47L 9/14*  (2006.01)
*B60S 1/64*  (2006.01)

(52) U.S. Cl.
CPC .............. *A47L 9/1409* (2013.01); *B60S 1/64* (2013.01)

(58) Field of Classification Search
CPC .......... A47L 7/0076; A47L 9/12; A47L 9/122; A47L 9/1409; A47L 9/22; B60S 1/64
USPC ........................................................ 15/347
See application file for complete search history.

(56) References Cited

U.S. PATENT DOCUMENTS

| | | | | |
|---|---|---|---|---|
| 2,226,630 A | * | 12/1940 | McCord | A47L 9/102 15/DIG. 8 |
| 3,431,581 A | * | 3/1969 | Booth | B60S 1/54 15/313 |
| 3,668,736 A | * | 6/1972 | Loscalzo | A47L 9/0613 15/375 |
| 5,593,470 A | * | 1/1997 | Shagott | A47L 5/38 55/357 |
| 6,101,670 A | * | 8/2000 | Song | A47L 9/19 15/347 |
| 6,219,880 B1 | * | 4/2001 | Worden | B01D 39/1623 55/432 |

(Continued)

FOREIGN PATENT DOCUMENTS

| | | | | |
|---|---|---|---|---|
| CA | WO-2018017568 A1 | * | 1/2018 | ............... A47L 5/38 |
| DE | 19911226 A1 | * | 9/2000 | ........... A47L 7/0038 |

(Continued)

*Primary Examiner* — Marc Carlson
(74) *Attorney, Agent, or Firm* — Marshall, Gerstein & Borun LLP

(57) ABSTRACT

A pre-filter for a filter system includes a frame having air flow openings having a height and an top portion having a width and a depth. The pre-filter includes a filter panel having a width less than or equal to the width of the top portion and a depth less than or equal to the depth of the top portion at least during insertion of the filter panel into the frame, and height equal to or greater than the height of the air flow openings. A filter system using the pre-filter includes a tank, an air intake aperture, an air exhaust aperture, and a cartridge filter. Another filter system has a relatively large air intake aperture that permits easy debris dumping. A vacuum cleaning system using the filter system includes a support structure connected to the filter system by a release lever.

35 Claims, 16 Drawing Sheets

(56) References Cited

U.S. PATENT DOCUMENTS

| | | | | |
|---|---|---|---|---|
| 6,598,263 B2* | 7/2003 | Boles | ............... | A47L 9/1409 55/300 |
| 7,000,287 B2* | 2/2006 | Valentini | ............ | B23Q 11/0046 15/327.2 |
| 7,144,438 B2* | 12/2006 | Lee | ............... | A47L 9/122 55/486 |
| 9,198,552 B2* | 12/2015 | Wolfe | ............... | A47L 7/0071 |
| 10,750,915 B2* | 8/2020 | Schultz | ............... | A47L 9/1463 |
| 10,806,313 B2* | 10/2020 | Garcia Vila | ............ | A47L 9/1481 |
| 11,134,815 B2* | 10/2021 | Liu | ............... | A47L 5/24 |
| 2002/0069627 A1* | 6/2002 | Park | ............... | B01D 46/88 55/498 |
| 2004/0060147 A1* | 4/2004 | Ashe | ............... | A47L 5/38 15/314 |
| 2004/0088817 A1* | 5/2004 | Cochran | ............... | A47L 5/36 15/327.5 |
| 2005/0247036 A1* | 11/2005 | Fujiyoshi | ............... | B01D 46/02 55/467 |
| 2007/0209146 A1* | 9/2007 | Mersmann | ............... | B01D 46/10 15/347 |
| 2007/0234504 A1* | 10/2007 | Bott | ............... | A47L 9/0081 15/300.1 |
| 2008/0115315 A1* | 5/2008 | White | ............... | A47L 9/122 15/347 |
| 2008/0230446 A1* | 9/2008 | Bertram | ............... | A47L 9/106 209/10 |
| 2009/0056060 A1* | 3/2009 | Han | ............... | A47L 5/28 15/159.1 |
| 2010/0139032 A1* | 6/2010 | Tomasiak | ............... | A47L 7/0042 29/402.01 |
| 2010/0154367 A1* | 6/2010 | Luo | ............... | A47L 5/362 55/456 |
| 2011/0154608 A1* | 6/2011 | Tsou | ............... | B43L 21/04 15/347 |
| 2018/0177367 A1* | 6/2018 | Amaral | ............... | A47L 9/102 |
| 2018/0235419 A1* | 8/2018 | Tahara | ............... | A47L 9/122 |
| 2019/0208972 A1* | 7/2019 | Yurko | ............... | A47L 9/1409 |
| 2019/0315317 A1* | 10/2019 | Gottschall | ............ | A47L 9/0036 |
| 2019/0320863 A1* | 10/2019 | Conrad | ............... | B01D 45/16 |
| 2019/0380549 A1* | 12/2019 | Liu | ............... | A47L 9/327 |
| 2020/0062223 A1* | 2/2020 | Norell | ............... | A47L 9/242 |
| 2020/0101946 A1* | 4/2020 | Gottschall | ............... | A47L 9/106 |
| 2020/0129022 A1* | 4/2020 | Gottschall | ............... | A47L 9/22 |
| 2020/0317162 A1* | 10/2020 | Yurko | ............... | A47L 7/0076 |

FOREIGN PATENT DOCUMENTS

| | | | | |
|---|---|---|---|---|
| DE | 102018112752 A1 | * | 12/2019 | |
| GB | 2167680 A | * | 6/1986 | ............ A47L 5/362 |
| JP | 53090657 A | * | 8/1978 | |
| JP | 05000123 A | * | 1/1993 | |
| JP | 06245880 A | * | 9/1994 | |
| WO | WO-9300035 A1 | * | 1/1993 | ............ A47L 9/0027 |

* cited by examiner

FILTER SYSTEM FOR A VACUUM CLEANER

CROSS-REFERENCE TO RELATED APPLICATIONS

This application claims the benefit of U.S. Provisional Application No. 62/752,743 filed Oct. 30, 2018, the entire contents of which are incorporated herein by reference in their entirety.

FIELD OF THE DISCLOSURE

This application relates generally to a filter system for a vacuum cleaner and, more specifically, to a filter system for a vacuum cleaner configured for installation in a vehicle. The filter system includes a pre-filter having a filter panel and a frame.

BACKGROUND

Routine cleaning of a vehicle often includes vacuuming the interior of the vehicle. However, reaching the various nooks and crannies of the interior of a vehicle to clear away debris can be difficult while simultaneously trying to position a cumbersome household vacuum cleaner or a bulky handheld vacuum cleaner. Accessing an industrial vacuum cleaner, such as that found at many car washes, is inconvenient. Accordingly, some vehicles are now equipped with a built-in vacuum cleaner to facilitate cleaning of the interior of the vehicle. Built-in vacuum cleaners in vehicles simplify cleaning of the vehicle but also present various design challenges that must be overcome in order for the built-in vacuum cleaner to be implemented effectively and unobtrusively into a vehicle. One of the design challenges is providing a functional and inconspicuous filter system that allows easy replacement of disposable filter components.

SUMMARY

The present disclosure provides a filter system for a vacuum cleaner. The filter system may be implemented in a vehicle. Alternately, the filter system may be used in conjunction with a vacuum cleaner that is not implemented or used in a vehicle. Moreover, the pre-filter discussed herein may be used with the filter system described herein. Alternately, the pre-filter may be used in a filter system that differs from that described in the present disclosure.

According to some aspects of the disclosure, a pre-filter for a filter system of a vacuum cleaner system configured to be mounted in a vehicle includes a frame and a filter panel. The frame includes a base, two sides connected to the base, a top portion having a width and a depth, a plurality of vertical struts connected to the base and to the top portion, and a plurality of air flow openings. The plurality of vertical struts and the plurality of air flow openings are arranged vertically across the base from one of the two sides to the other of the two sides. At least one air flow opening of the plurality of air flow openings has a height. The filter panel has a width less than or equal to the width of the top portion of the frame at least during insertion of the filter panel into the frame, a depth less than or equal to the depth of the top portion of the frame at least during insertion of the filter panel into the frame, and a height equal to or greater than the height of the at least one air flow opening.

According to some aspects of the disclosure, a vacuum cleaner system configured to be mounted to a vehicle includes a tank having an air intake aperture and an air exhaust aperture. The vacuum cleaner system further includes a pre-filter such as that described in the preceding paragraph. The pre-filter is disposed in the tank and divides the tank into a first chamber having the air intake aperture and a second chamber having the air exhaust aperture.

According to other aspects of the disclosure, a vacuum cleaner system comprises a tank and a filter system having a pre-filter including a frame and a filter panel. The tank includes a lid, an air intake aperture provided in the lid of the tank, the air intake aperture having a width and a depth, and an air exhaust aperture provided in the tank. The pre-filter divides the tank into a first chamber having the air intake aperture and a second chamber having the air exhaust aperture. The first chamber has a width and a depth such that the maximum width of the air intake aperture is at least 75% of the width of the first chamber and the maximum depth of the air intake aperture is at least 75% of the depth of the first chamber.

According to some aspects of the disclosure, a vacuum cleaner system comprises a tank, a filter system, a support structure coupled to the tank, and a release lever connected to the tank. The tank includes sides, a lid including a lid latch connectable to one of the sides of the tank, an air intake aperture, and an air exhaust aperture. The filter system has a pre-filter including frame and a filter panel. The pre-filter divides the tank into a first chamber having the air intake aperture and a second chamber having the air exhaust aperture. The release lever includes a first prong configured to engage the lid of the tank and a second prong configured to engage the support structure.

According to some aspects of the disclosure, a vacuum cleaner system includes a tank and a filter system. The tank includes sides, a lid, an air intake aperture provided in the lid of the tank, and an air exhaust aperture provided in the tank. The air intake aperture has an edge wall. The filter system has a pre-filter including a frame and a filter panel. The pre-filter divides the tank into a first chamber having the air intake aperture and a second chamber having the air exhaust aperture. The first chamber has a circumferential edge, a portion of the circumferential edge formed by at least one of the sides of the tank or the pre-filter. The edge wall of the air intake aperture extends along at least the portion of the circumferential edge of the first chamber formed by the at least one of the sides of the tank or the pre-filter.

In some arrangements, the filter panel may comprise reticulated foam. The filter panel may have rectangular sides adjacent to the plurality of struts. The frame may include two air flow openings. Each of the plurality of air flow openings may be identical. The base of the frame may have a first depth when adjacent to one of the plurality of air flow openings and a second depth when adjacent to one of the plurality of struts, and the first depth may be less than the second depth.

In other arrangements, at least one of the plurality of struts may be trapezoidal, and the plurality of air flow openings may be trapezoidal. The at least one of the plurality of struts that is trapezoidal may have the shape of an isosceles trapezoid, and the plurality of air flow openings that are trapezoidal may have the shape of an isosceles trapezoid. One or more of the vertical struts may be connected to the sides of the frame, and one or more of the vertical struts may be connected only to the base and to the top portion. The one or more of the vertical struts connected to the sides may have a different shape than the one or more of the vertical struts connected only to the base and to the top portion. Each vertical strut of the plurality of vertical struts may be aligned with another vertical strut of the plurality of vertical struts across the base that has the same shape.

In still other arrangements, the tank may include four sides, a bottom, and a lid connectable to one or more of the four sides. At least one of the four sides of the tank, the bottom of the tank, the lid of the tank, or a combination thereof may include a first geometry, and at least one of the two sides of the frame may include a second geometry that is complementary to the first geometry. The first geometry may be a slanted surface of one of the four sides of the tank at a first angle relative to the bottom of the tank, and the second geometry may be a slanted surface of one of the two sides of the frame at a second angle relative to the bottom of the tank, wherein the first angle is identical to the second angle. The first geometry may be a projection on one of the four sides of the tank, and the second geometry may be a curvature on one of the two sides of the frame that is complementary to the projection.

In some arrangements, the tank may include a lid having a recess, and the width of the top portion may be equal to or less than a width of the recess of the lid of the tank. A distance between the two sides may be greater than the width of the top portion. A cartridge filter may cover the air exhaust aperture. Ribs may be provided on the tank adjacent to at least one of the two sides of the frame for purposes of locating the frame within the tank.

In other arrangements, the air intake aperture may include an edge wall. The tank may include four sides and a bottom, and the edge wall may be adjacent three of the four sides of the tank and adjacent the pre-filter. In some arrangements, a cartridge filter may cover the air exhaust aperture, and the air exhaust aperture may be provided in the lid and may include a boundary wall adjacent the cartridge filter. The filter system may include an interference rib extending from the lid that contacts the filter panel along the entire width of the filter panel when the lid is closed. The filter system may further include a bag mount connected to the tank adjacent the air intake aperture.

Further, the in-vehicle vacuum cleaning system may include a hose lock connected to the support structure, and a hose connected to the hose lock, wherein the hose is in fluid communication with the first chamber. In some arrangements, the vacuum cleaning system may further comprise a worm gasket in contact with the support structure and the lid and/or an o-ring in contact with the support structure and the hose. A motor/impeller unit may be connected to the support structure. A cartridge filter may cover the air exhaust aperture.

In some arrangements, a support structure may be coupled to the tank and a worm gasket may be in contact with the support structure and the lid of the tank. In some arrangements, the filter system may include an interference rib extending from the lid that contacts the filter panel along the entire width of the filter panel when the lid is closed. In some arrangements, the interference rib further extends from a side or a base of the frame. In some arrangements, the portion of the circumferential edge is formed at least by the pre-filter, and the edge wall of the air intake aperture extends along the pre-filter.

BRIEF DESCRIPTION OF THE DRAWINGS

The Figures described below depict various aspects of the system and methods disclosed therein. It should be understood that each figure depicts an example of a particular aspect of the disclosed system and methods, and that each of the figures is intended to accord with a possible example thereof. Further, wherever possible, the following description refers to the reference numerals included in the following figures, in which features depicted in multiple figures are designated with consistent reference numerals.

There are shown in the drawings arrangements which are presently discussed, it being understood, however, that the present examples are not limited to the precise arrangements and instrumentalities shown, wherein.

DETAILED DESCRIPTION

A pre-filter for various filter systems for vacuum cleaners, such as a vacuum cleaner system configured to be disposed in a vehicle, is described herein. The pre-filter includes a frame and a filter panel. In order for the filter panel to fit within the frame, at least during insertion of the filter panel into the frame, the filter panel is configured to have a width less than or equal to a width of a top portion of the frame, a depth less than or equal to a depth of the top portion of the frame, and a height equal to or greater than the height of air flow openings arranged across the frame. The pre-filter is disclosed as being used in filter system for an in-vehicle vacuum cleaner assembly according to one aspect of the present disclosure.

Also disclosed is a another filter system for an in-vehicle vacuum cleaner. The filter system includes a pre-filter that divides a tank into a first chamber having an air intake aperture and a second chamber having an air exhaust aperture, the air intake aperture being enlarged to facilitate dumping debris. In particular, the first chamber has a width and a depth such that the maximum width of the air intake aperture is at least 75% of the width of the first chamber and the maximum depth of the air intake aperture is at least 75% the depth of the first chamber. The filter system is disclosed as being used in an in-vehicle vacuum cleaning system including a support structure covering the tank and a release lever connected to the tank. The release lever includes a first prong configured to engage the lid of the tank and a second prong configured to engage the support structure. Additional vacuum components, such as a motor unit, may be connected to the support structure.

Figure 1:
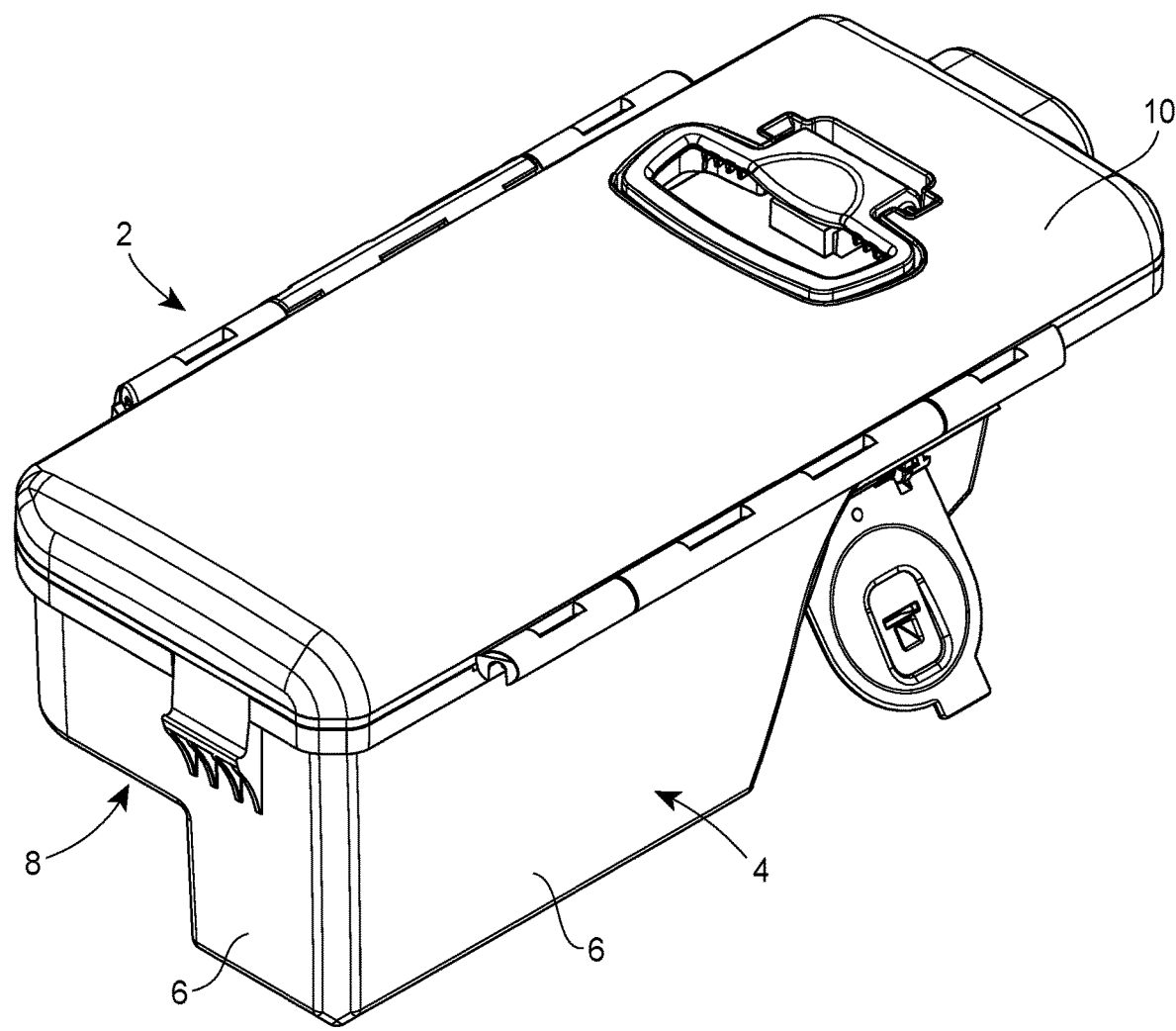
FIG. 1 is a top isometric view of a filter system for a vacuum cleaner of the present disclosure in a closed configuration.

Referring now to the exemplary arrangement of a filter system 2 shown in FIG. 1, the filter system 2 includes a tank 4 having four sides 6, a bottom 8, and a lid 10 connectable to one or more of the four sides 6. Specifically, in the arrangement shown in FIG. 1, the lid 10 is hinged to one of the sides 6 and is in a closed configuration. In other arrangements not depicted, the lid 10 may be hinged to a different one of the sides 6. Alternately, the lid 10 may be connectable to one or more of the sides 6 via a direct press fit or via a separate fastening mechanism. Examples of fastening mechanisms that may be used to connect the lid 10 to one or more of the sides 6 include pins, screws, clips, magnets, and other known fasteners.

In the arrangement of the filter system 2 shown in FIG. 1, the tank 4 has dimensions that allow the tank 4 to be coupled to a vacuum of a vacuum cleaner system to fit within a center console of a vehicle. The center console is a desirable location for the filter system 2 because a center console will enclose the filter system 2 so that the filter system 2 is not an eyesore in the interior of the vehicle, while simultaneously keeping the filter system 2 accessible so that disposable filter components can be easily replaced. However, the filter system 2 may be configured to fit within other spaces of the vehicle. For example, the tank 4 may have dimensions that allow the tank 4 to fit within a glove compartment box, a trunk, a door side panel, or another desirable location in a vehicle. Alternately, the tank 4 may be configured for a location that is not inside a vehicle. The filter system 2 may have less than or more than four sides 6. Portions of a vehicle itself may form sides 6, a base 10, or a lid 10 of the filter system. For example, the glove compartment door may function as a lid 10 of a filter system 2 placed within the glove compartment.

Figure 2:
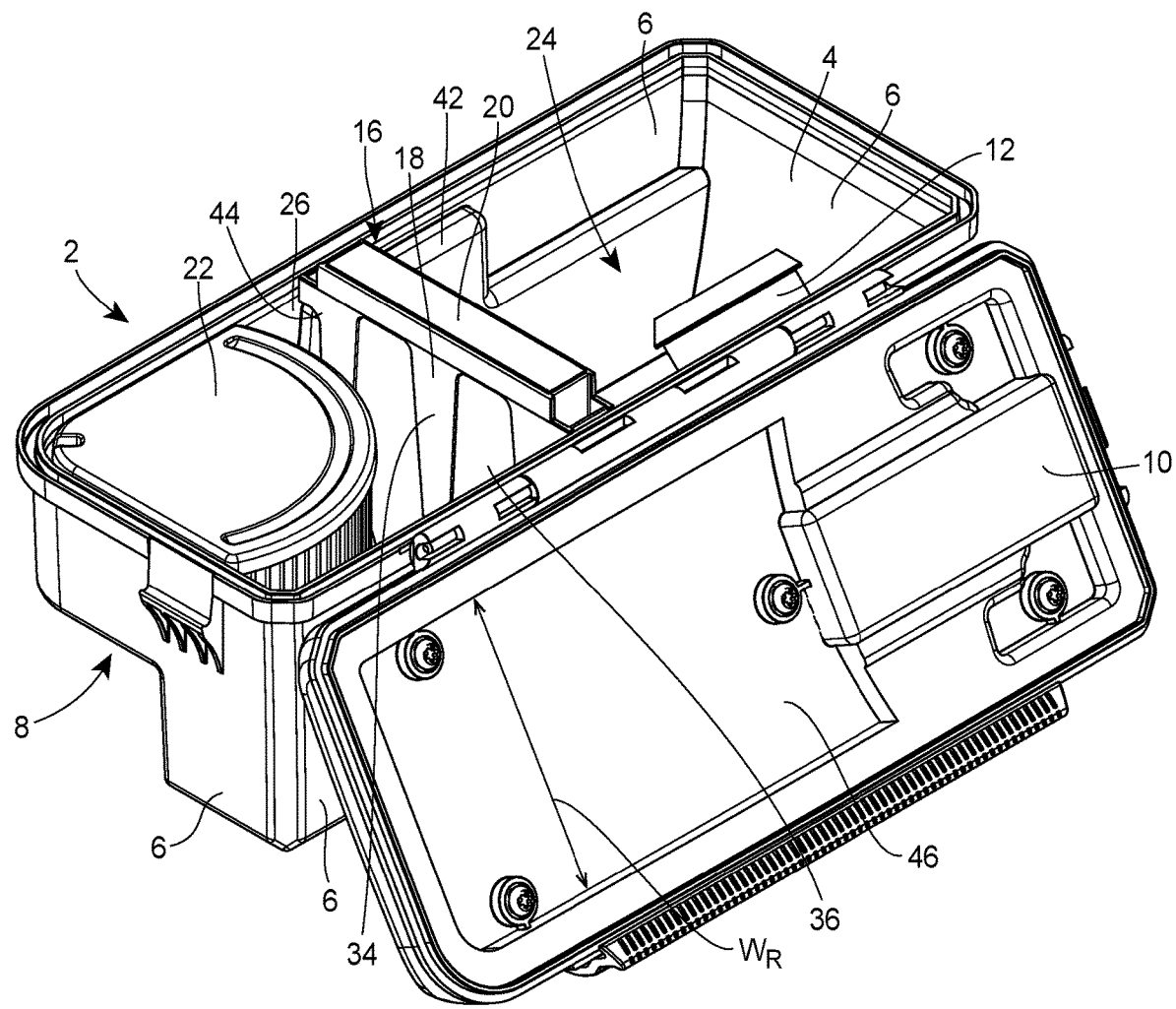
FIG. 2 is a top isometric view of the filter system of FIG. 1 in an open configuration.
Figure 5:
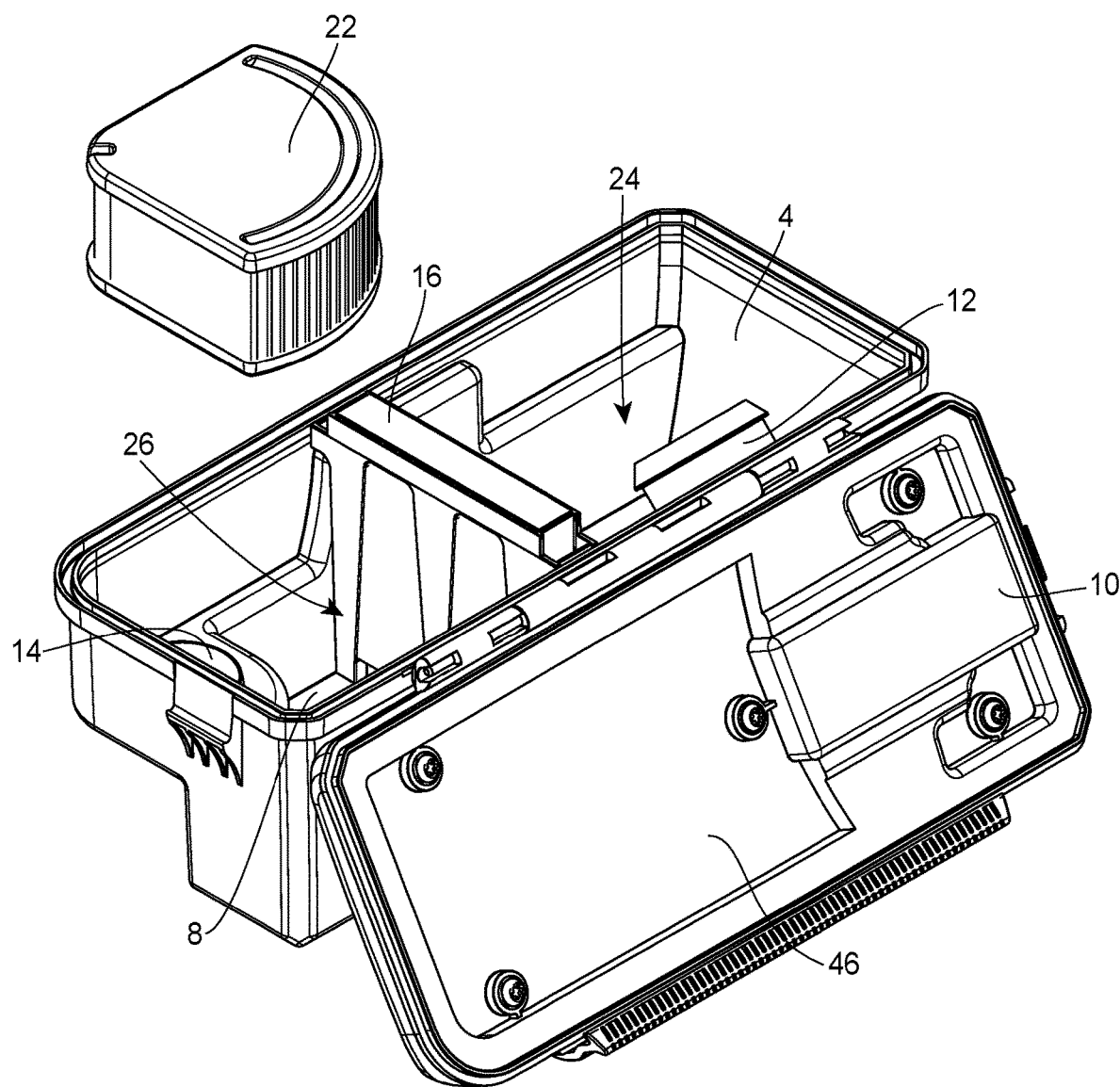
FIG. 5 is a top isometric view of the filter system of FIGS. 1-4 in an open configuration with a filter cartridge removed from the tank.

Turning to FIG. 2, the lid 10 is in an open configuration. The filter system 2 includes an air intake aperture 12, such as a dirty air intake aperture, provided in the tank 4. The air intake aperture 12 may include a guide tunnel to direct the air as it enters the tank 4. The size of the air intake aperture 12 may be equal to the size of a vacuum hose (not pictured) being used with the filter system 2. Alternatively, as described below, the air intake aperture 12 may be larger than the size of a vacuum hose. A pre-filter 16 divides the tank 4 into a first chamber 24 and a second chamber 26. The air intake aperture 12 is located in the first chamber 24. An air exhaust aperture 14 (shown in FIG. 5), such as a clean air exhaust aperture, is covered by a cartridge filter 22 in the second chamber 26 in FIG. 2.

During use of the filter system 2, air flows into the first chamber 24 through the air intake aperture 12. The air then travels through the pre-filter 16. Most of the debris in the air is removed from the air during the passage of the air through the pre-filter 16. As a result, most of the debris in the air falls to the bottom 8 of the tank 4 in the first chamber 24. In the arrangement depicted in FIGS. 2 and 5, the first chamber 24 is larger than the second chamber 26 in order to accommodate this debris. However, the first chamber 24 does not necessarily have to be larger than the second chamber 26. After traveling through the pre-filter 16, the cleaner air then continues to flow through the filter system 4 by crossing the second chamber 26 and entering the cartridge filter 22.

In the arrangement shown, the cartridge filter 22 has a partially cylindrical shape and is designed to fit in a corner of the tank 4 between two sides 6 and the bottom 8. The cartridge filter 22 may alternately be fully cylindrical in shape or may have another desirable shape. The cartridge filter 22 may include any standard industrial filter material, such as synthetic material, cloth, paper, or foam. The cartridge filter 22 may employ a standard filtration material, a HEPA filtration material, an S-class filtration material, or activated charcoal filtration, among other options. The air that has traveled across the second chamber 26 undergoes a second filtration via the cartridge filter 22.

Ultimately, the cleaned air is expelled through air exhaust aperture 14. In the arrangement depicted in FIG. 2 and better shown in FIG. 5, the air exhaust aperture 14 is located on a side 6 of the tank. In other arrangements, the air exhaust aperture 14 may be located in the bottom 8 or the lid 10 of the tank 4.

Figure 3:
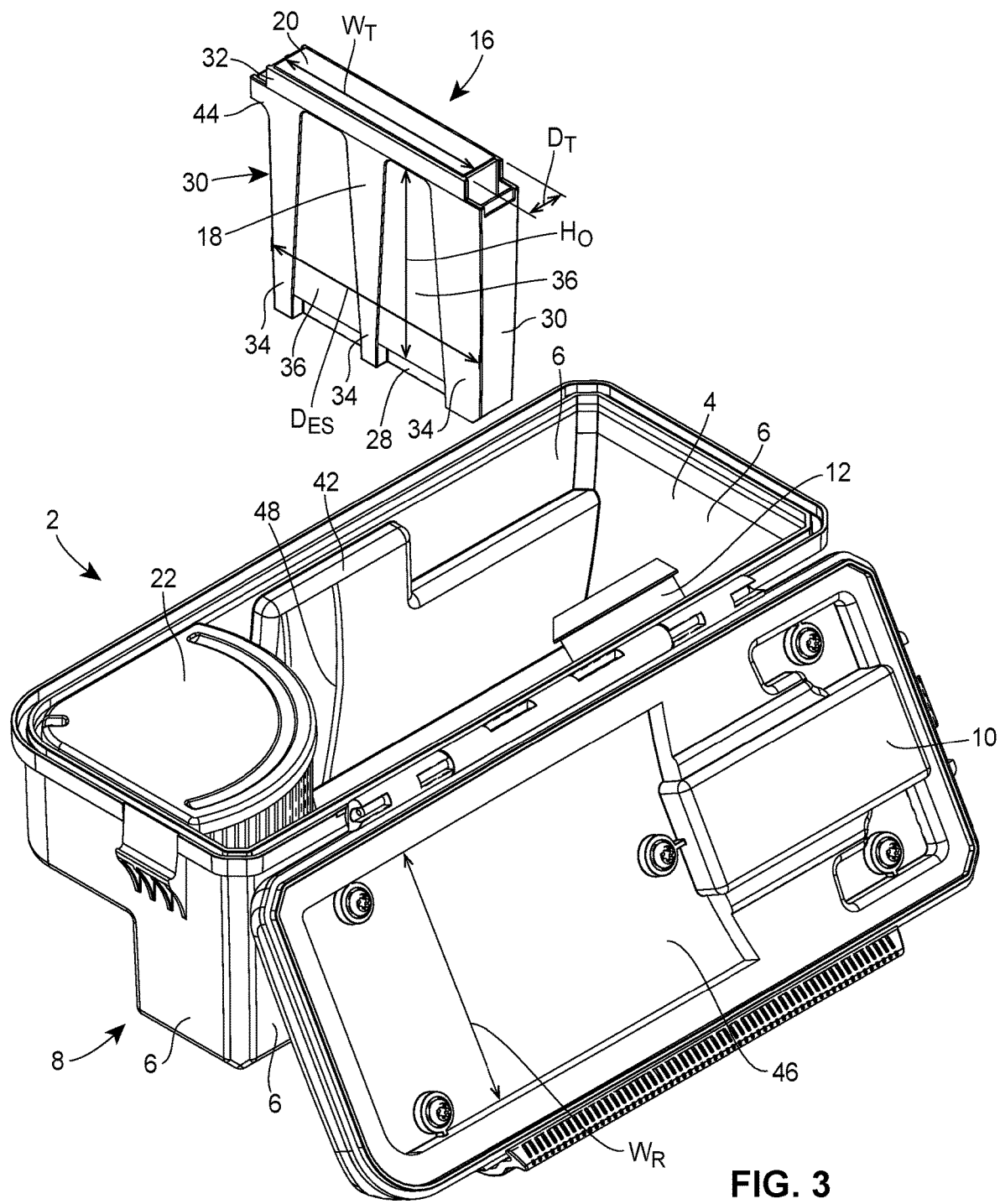
FIG. 3 is a top isometric view of the filter system of FIGS. 1 and 2 in an open configuration with the pre-filter removed from the tank in a fully assembled state.
Figure 4:
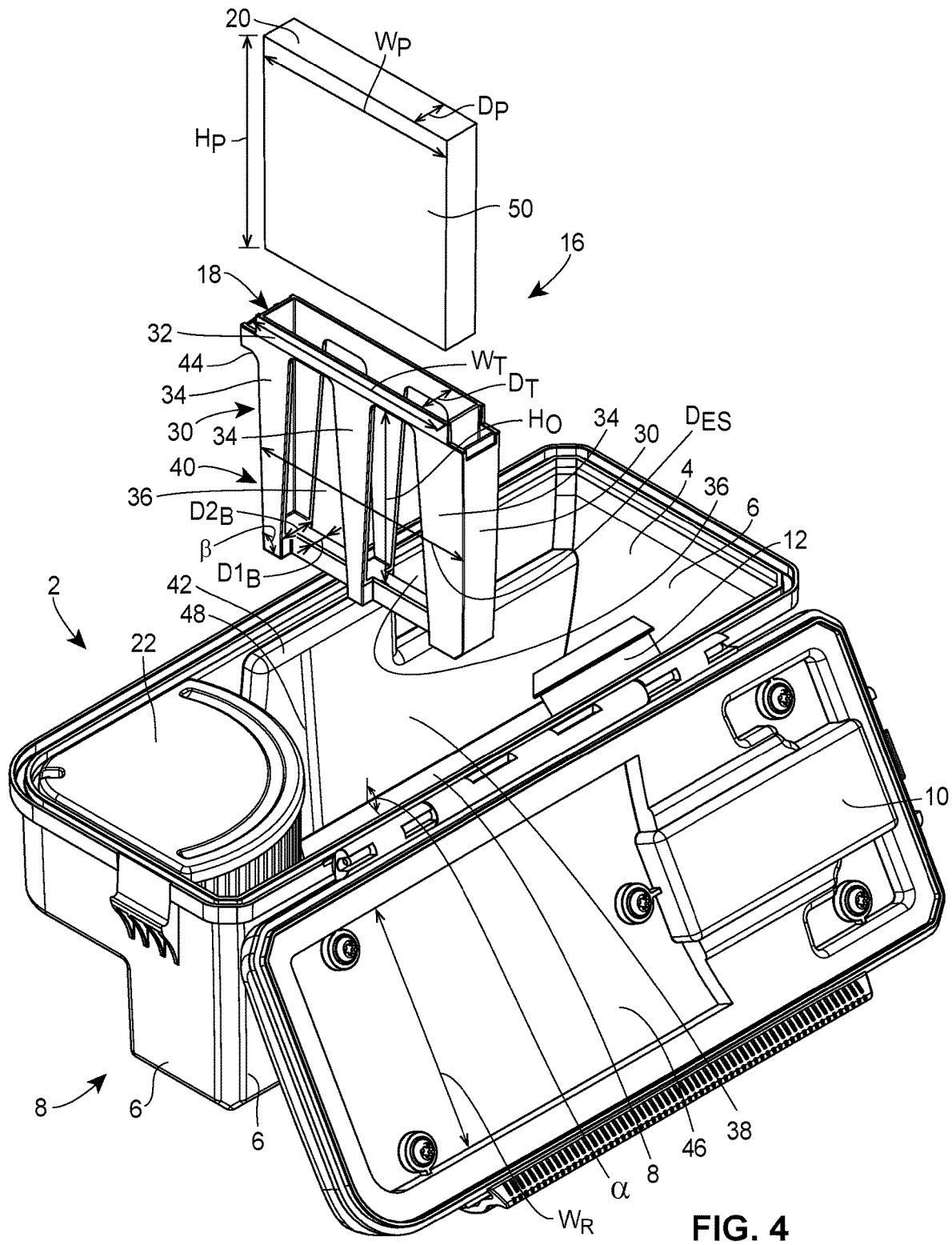
FIG. 4 is a top isometric view of the filter system of FIGS. 1-3 in an open configuration with the pre-filter removed from the tank and in a disassembled state.

Turning now to FIGS. 3 and 4, the pre-filter 16 includes a frame 18 and a filter panel 20. The frame 18 is a reusable component of the filter system 2 that is configured to fit vertically within the tank 4. The filter panel 20 is a disposable or replaceable filter material that is inserted into the frame 18. The filter panel may also be made from a washable filter material. The filter panel 20 may comprise reticulated foam. The filter panel may comprise polyethylene, polypropylene, polyethylene/EVA block-type, polyolefin, polyether urethane, and/or polyester foam, among other options. The frame 18 provides structural integrity to the filter panel 20 during use of the filter system 2. The frame 18 is removable from the tank 4 to facilitate checking on and/or replacing the filter panel 20.

The frame 18 includes a base 28, two sides 30 connected to the base 28, and an top portion 32. A plurality of vertical struts 34 are connected to the base 28 and to the top portion 32. The plurality of vertical struts 34 and a plurality of air flow openings 36 are arranged vertically across the base 28 from one of the sides 30 to the other of the sides 30. In the arrangements shown in FIGS. 2-5, the frame 18 includes two air flow openings 36.

As best shown in FIG. 4, the top portion 32 has a top width $W_T$ and a top depth $D_T$. As shown in FIG. 4, the filter panel 20 has a width WP that is less than or equal to the top width $W_T$ at least during insertion of the filter panel into the frame and depth $D_P$ that is less than or equal to the depth of the top portion $D_T$ at least during insertion of the filter panel into the frame. This allows the filter panel 20 to be inserted through the top portion 32 into the frame 18. In some arrangements, the filter panel 20 may have some areas that are wider or deeper than other areas in order to create an interference fit with the frame 18. The requisite sizes may only occur when the filter panel 20 is compressed during insertion, thereby ensuring a snug fit within the frame 18 when the filter panel 20 expands after insertion. Additionally, as shown in FIG. 4, air flow openings 36 have a height Ho and the filter panel 20 has height Hp that is equal to or greater than the height of the air flow openings Ho. This ensures the filter panel 20 fully covers the area of the air flow openings 36 so that no air can pass through the pre-filter 16 without going through the filter panel 20, thereby being cleaned of debris.

The frame 18 and the tank 4 may be designed to include features that ensure proper alignment of the frame 18 within the tank 4 and a snug fit of the frame 18 with the tank 4. For example, at least one of the four sides 6 of the tank 4, the bottom 8 of the tank 4, the lid 10 of the tank 4, or a combination of these various parts of the tank 4 may include a first geometry, and at least one of the two sides 30 of the frame 18 may include a second geometry that is complementary to the first geometry. For example, as shown in FIG. 4, the first geometry may be a slanted surface 38 of one of the four sides 6 of the tank 4 at a first angle α relative to the bottom 8 of the tank 4. As also shown in FIG. 4, the second geometry may be a slanted surface 40 of one of the two sides 30 of the frame 18 at a second angle β relative to the bottom 8 of the tank 4. The first angle α may be identical to the second angle β so that the corner of the tank 4 and the corner of the frame 18 fit snugly and the respective slanted surfaces 38 and 40 are placed against one another.

As another example, the first geometry of the tank 4 may be a projection 42 on a side 6 of the tank 4, and the second geometry of the frame 18 may be a curvature 44 on one of the two sides 30 of the frame 18 that is complementary to the projection 42. As shown in FIGS. 3 and 4, the projection 42 may be a large area of a side 6 of tank 4, and the curvature 44 may be a relatively small area of a side 30 of the frame. In other arrangements not herein depicted, a variety of different complementary first and second geometries are possible. For example, the tank 4 may have an undulating surface area that is matched by a complementary undulating surface area of the frame 18. The tank 4 may have an asymmetrical geometry such that one side 6 of the tank 4 is different than the other side 6 of the tank 4, and the frame 18 may have a complementary asymmetrical geometry such that one side 30 is different than the other side 30. Such an asymmetrical geometry of the tank 4 and the frame 18 is shown in FIGS. 3 and 4 in part as a result of the lid 10 being hinged to only one side 6 of the tank 4.

The tank 4 and the frame 18 may also include alignment features. For example, the tank 4 may have ribs 48 provided on a side 6, as shown in FIGS. 3 and 4. When the frame 18 is placed in the tank 4, the ribs 48 may be adjacent to at least one of the two sides 30 of the frame 18. The ribs 48 help guide the frame 18 in and out of the tank 4, and they also help to secure the frame 18 in place once the frame 18 has been fully inserted into the tank 4. Examples of other alignment features are a change in color, a sticker, or a different surface texture at the portion of the tank 4 where the frame 18 is to be placed. Such features visually or viscerally indicate where the frame 18 should be inserted and may also provide functional benefits. For example, the tank 4 may generally have a pebbled texture but may be smooth where the frame 18 is inserted so as to visually indicate the proper location of the frame 18 and also to reduce the coefficient of friction during placement of the frame 18.

Referring to FIG. 4, the plurality of vertical struts 34 may be arranged and connected in various ways. For example, one or more of the vertical struts 34 may be connected to a side 30 of the frame 18. Other of the vertical struts 34 may be connected only to the base 28 and to the top portion 32. For example, in the arrangement depicted in FIGS. 2-5, the vertical struts 34 on the outside of the base 28 are connected to a side 30. Meanwhile, the central vertical struts 34 on each side of the base 28 are connected only to the base 28 and to the top portion 32.

The plurality of vertical struts 34 may have a variety of shapes. Each vertical strut 34 may have an identical shape. Alternately, some vertical struts 34 may have different shapes than other vertical struts 34. In the arrangement depicted in FIGS. 2-5, the vertical struts 34 connected to the sides 30 have a different shape than the struts connected only to the base 28 and to the top portion 32. In the arrangement depicted in FIGS. 2-5, all of the vertical struts 34 are trapezoidal. The central vertical struts 34 have the shape of an isosceles trapezoid. In other arrangements not herein depicted, the vertical struts may be rectangular or may have an eclectic shape. In the arrangements shown in FIGS. 2-5, each vertical strut 34 is aligned with another vertical strut 34 across the base 28 that has the same shape. In other arrangements not herein depicted, each vertical strut 34 may not be aligned with another vertical strut 34 across the base 28. In yet other arrangements not herein depicted, each vertical strut 34 may be roughly aligned with another vertical strut 34 across the base 28 but the roughly aligned vertical struts 34 may not have the same shape.

The shape of the airflow openings 36 is defined in part by the shape of the vertical struts 34. In the arrangement depicted in FIGS. 2-5, each of the plurality of air flow openings 36 is identical and trapezoidal. Specifically, each of the plurality of air flow openings 36 has the shape of an isosceles trapezoid. In other arrangements not herein depicted, some of the air flow openings 36 may have a different shape than others of the air flow openings 36. Additionally, the air flow openings 36 may have a non-trapezoidal shape, such as a rectangular or eclectic shape. For example, the eclectic shape may include curved or wavy edges, may be circular or partially round or oblong, may have some curved edges and some straight edges, and/or may be a complex geometric design.

In the arrangement depicted in FIGS. 2-5, the filter panel 20 has rectangular sides 50 (shown in FIG. 4). The rectangular sides 50 are adjacent the plurality of struts 34. Once inserted, the filter panel 20 rests on the base 28 of the frame 18 shown in FIGS. 3 and 4. The base 28 of the frame has a first depth $D1_B$ when adjacent to one of the plurality of air flow openings and a second depth $D2_B$ when adjacent to one of the plurality of struts 34, as shown in FIG. 4. In the arrangement depicted in FIG. 4, the first depth $D1_B$ is less than the second depth $D2_B$. The benefit of the base being designed in this manner is that the air that hits the base 28 can enter the filter panel 20 from underneath the filter panel 20 in the areas adjacent to the air flow openings 20. This facilitates air flow through the filter system 2. However, in other arrangements not herein depicted, the first depth $D1_B$ may be less than or equal to the second depth $D2_B$.

In the arrangements shown in FIGS. 2-5, the lid 10 has a recess 46. As shown in FIGS. 3 and 4, the recess 46 has a recess width $W_R$, and the top width $W_T$ of the top portion 32 of the frame 18 is equal to or less than the recess width $W_R$. This enables the top portion 32 to fit within the lid 10 when the filter system 2 is in a closed configuration, such as that depicted in FIG. 1. The rest of the tank 4 is wider than the recess 46 of the lid 10, so the top width $W_T$ of the top portion 32 is less than the distance $D_ES$ between the two sides 30 of the frame 18, as shown in FIGS. 3 and 4.

The shape of the lid 10 may vary depending on the location within a vehicle where the filter system 2 is placed or the specific dimensions of the vehicle model in which the filter system 2 is placed. The shape of the lid 10 may also vary if the filter system 2 is placed in a location that does not include a vehicle. The frame 18, and specifically the top portion 32, must be adjusted to fit within the tank 4 when the lid 10 is closed. Likewise, the distance $D_ES$ between the two sides 30 of the frame 18 should be adjusted depending on the dimensions of the rest of the tank 4. In some arrangements, the top width $W_T$ of the top portion 32 may be greater than or equal to the distance $D_ES$ between the two sides 30 of the frame 18.

Figure 6A:
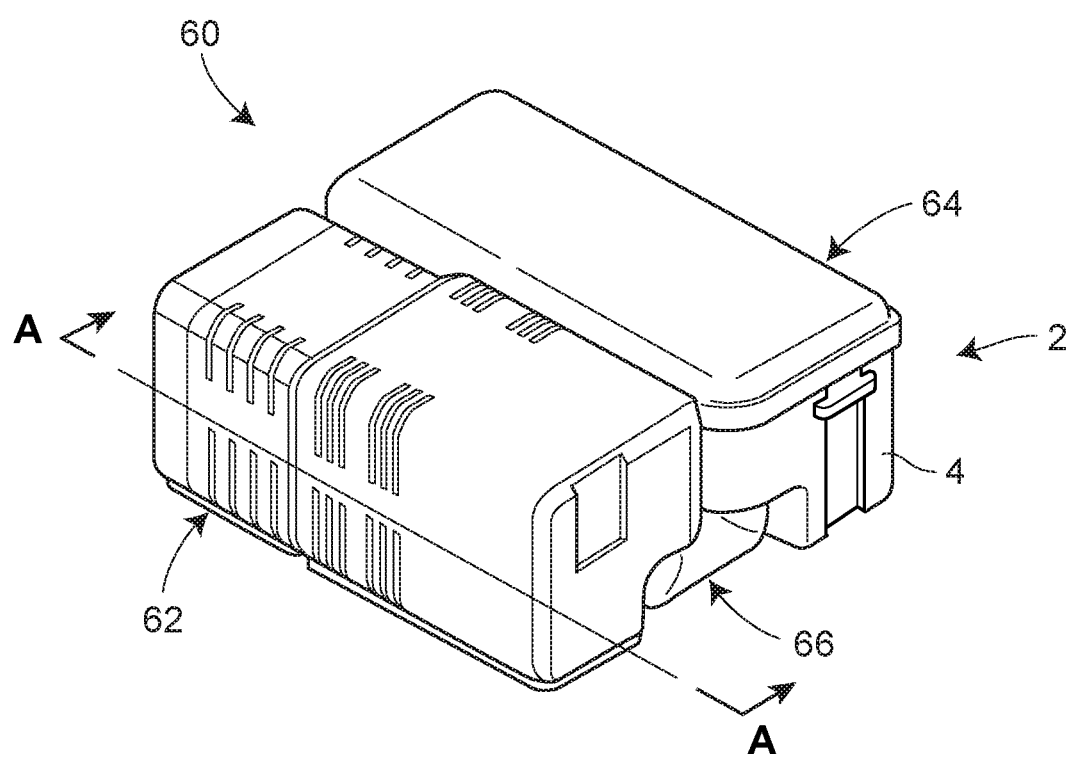
FIG. 6A is an isometric view of a vacuum cleaner system incorporating the filter system of FIG. 1.
Figure 6B:
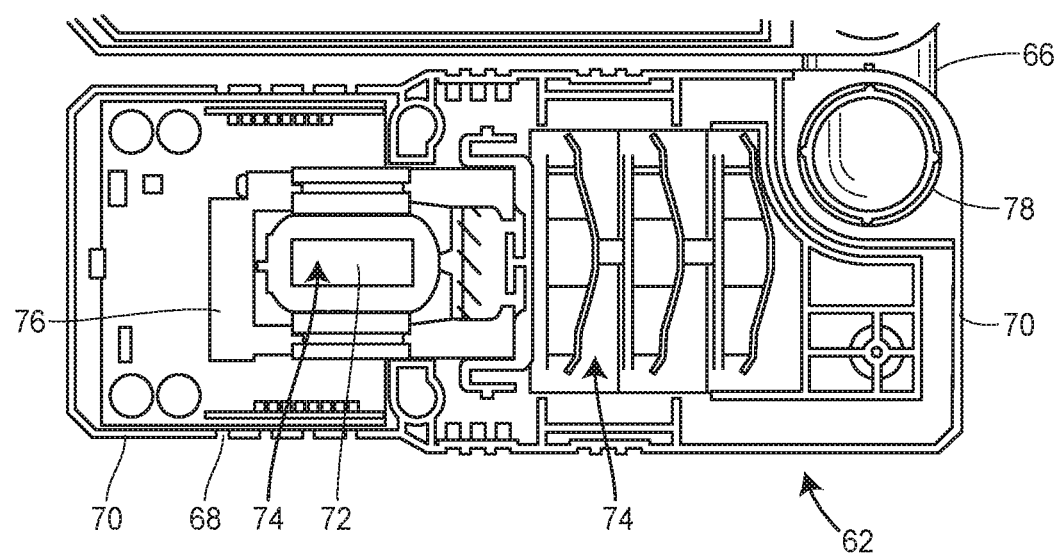
FIG. 6B is a cross-sectional view of a portion of the vacuum cleaner system of FIG. 6A, taken along the line A-A of FIG. 6A.
Figure 7:
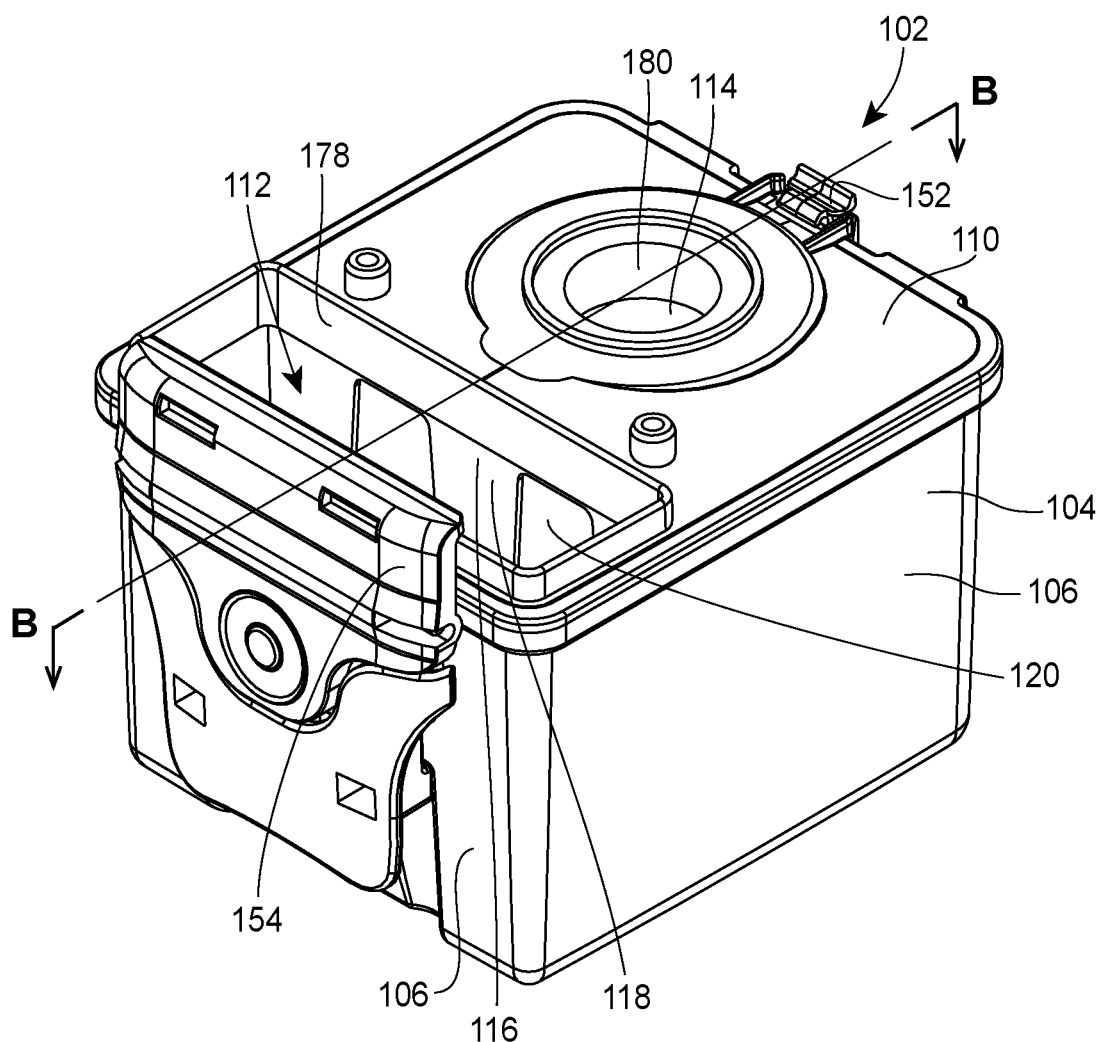
FIG. 7 is a top isometric view of another filter system of the present disclosure, the filter system adapted to be disposed in another vacuum cleaner and including a lid having a large air inlet aperture relative to a first chamber, in which the lid is shown secured to the tank.

Referring now to FIG. 6A-6B, a vacuum cleaner system 60 incorporating the filter system 2 of FIG. 1 is depicted. In this example, the vacuum cleaner system 60 has a modular configuration, including a vacuum module 62 that is operatively coupled to a collector module 64 having the tank 4 and the filter system 2 described above. The vacuum module 62 and the collector module 64 may be connected to each other as an integrated unit in any of a plurality of different pre-defined assembly arrangements with an interconnecting duct, such as an elbow assembly 66. While the vacuum cleaner assembly 60 is depicted with the collector module 64 operatively connected to the vacuum module 62 in a side-by-side configuration, the vacuum cleaner system 60 may alternatively be disposed in an in-line configuration or an upright installation orientation, and still incorporate the filter system 2 of the present disclosure.

Because of its modular configuration, the vacuum cleaner system 60 can be easily assembled and/or oriented in many different shapes and orientations. As a result, one can easily configure the vacuum cleaner system 60 to fit different shapes and/or configurations of receptacle spaces within a vehicle, while maintaining the vacuum cleaner system 60 as an integrated unit. For example, the vacuum cleaner system 60 may be configured and oriented to fit in a space between seats, such as within a center console. Alternatively, the vacuum cleaner system 60 may be configured and oriented to fit on the side or underneath a seat, in a space along the side wall of a cargo bay or passenger compartment of a sport utility vehicle (SUV) or in the trunk.

Referring now to FIG. 6B, the vacuum module 62 includes a motor/impeller unit 68 within a motor housing 70. The motor housing 70 has an outer shell with a generally elongate rectangular form. The motor housing 70 may take many different forms and shapes and sizes depending upon the particular space needs and/or arrangements desired for installation in a particular vehicle and still fall within the scope of the present disclosure. The motor/impeller unit 68 includes a motor 72 that drives an impeller assembly 74, and a controller 76 that controls the motor 72. The motor 72 can be of any design suitable for vacuum cleaners, including standard motors with brushes or brushless motors, and switched reluctance motors. The impeller assembly 74 may take any form suitable for moving air in a manner that will create a vacuum. In this arrangement, the impeller assembly 74 includes three in-line impellers. However, other forms of the impeller assembly 74 may also be used. The motor 72 is operatively coupled to the impeller assembly 74 to drive the impellers to create a vacuum. The controller 76 includes suitable electronics, such as a PCB board and/or other appropriate electronic control circuits configured to control the motor 72. As also depicted in FIG. 6B, the motor housing 70 includes an intake opening 78 that forms a duct receiver and an air inlet for air that is drawn into the impeller assembly 74.

Turning now to FIGS. 7-10, another filter system 102 of the present disclosure is shown that includes a tank 104 with a lid 110 having a relatively large air intake aperture 112 in order to facilitate dumping debris from the filter system 102 with a lid 110 closed. The filter system 102 is unlike the filter system 2 shown in FIGS. 1-5 in which the lid 10 has to be opened in order for debris to be dumped out of the filter system 2. The air intake aperture 112 is provided in the lid 110, and an air exhaust aperture 114 provided in the tank 104. A pre-filter 116 includes a frame 118 and a filter panel 120, and a cartridge filter 122 surrounds the air exhaust aperture 114. The pre-filter 116 divides the tank 104 into a first chamber 124 having the air intake aperture 112 and a second chamber 126 having the air exhaust aperture 114.

Figure 8:
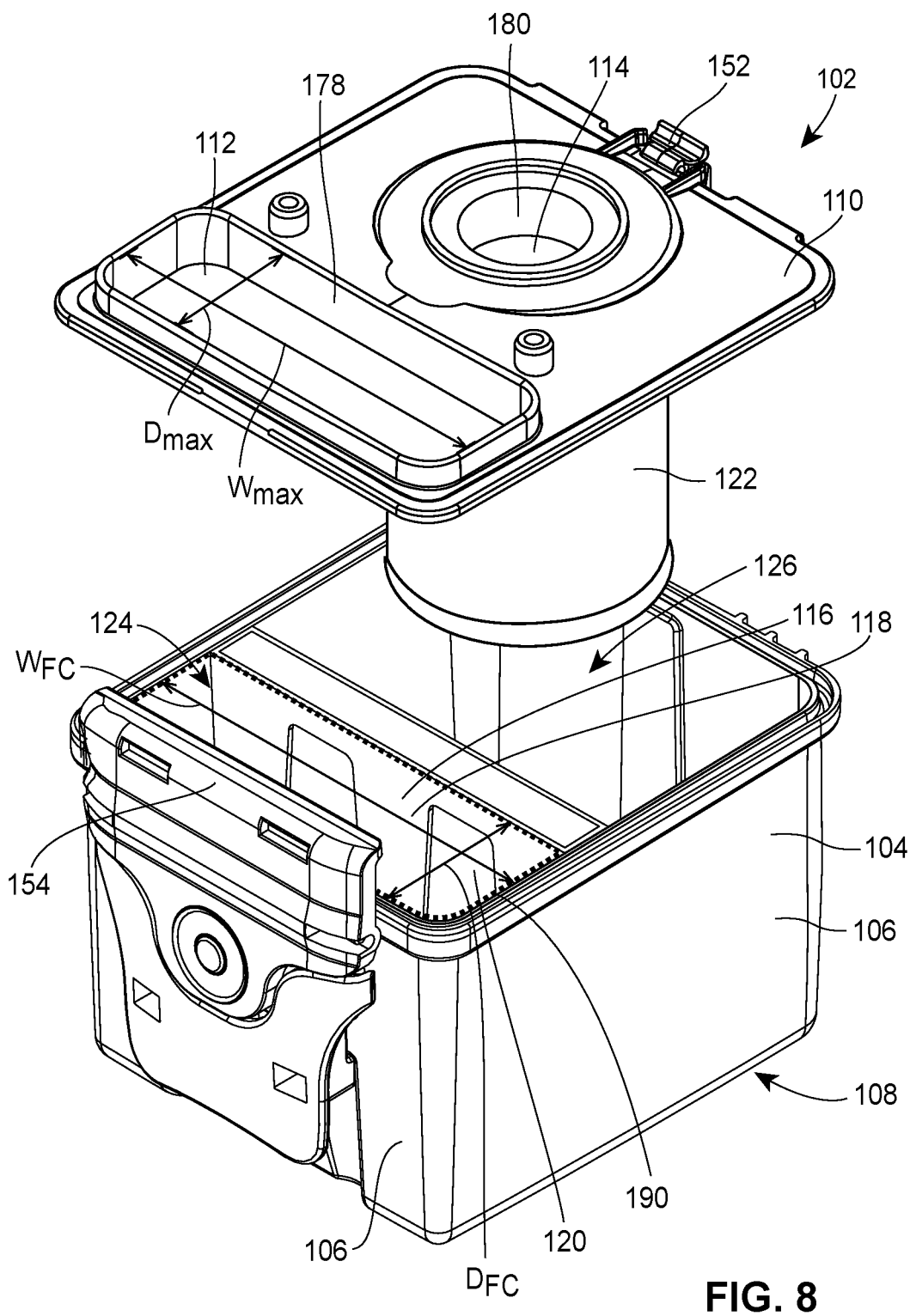
FIG. 8 is a top isometric view of the filter system of FIG. 7 with the lid and cartridge filter removed from within the tank.

In general, the filter system 102 includes a relatively large air intake aperture 112 that is intended to both allow dirty air to enter the filter system 102 and to allow debris that has accumulated in the first chamber 124 to be easily dumped out of the filter system 102. Accordingly, the size of the air intake aperture 112 is larger than a conventional air intake aperture that functions only to allow dirty air to enter. For example, as best shown in FIG. 8, the first chamber 124 has a width $W_{FC}$ and a depth $D_{FC}$. The air intake aperture 112 has a maximum width $W_{max}$ and a maximum depth $D_{max}$. The maximum width $W_{max}$ of the air intake aperture 112 is at least 75% of the width $W_FC$ of the first chamber 124 and the maximum depth $D_{max}$ of the air intake aperture 112 is at least 75% the depth $D_FC$ of the first chamber 124. The maximum width $W_{max}$ of the air intake aperture 112 may be equal to or greater than other larger percentages of the width $W_FC$ of the first chamber 124. Similarly, the maximum depth $D_{max}$ of the air intake aperture 112 may be equal to or greater than other larger percentages of the depth $D_FC$ of the first chamber 124.

The air intake aperture 112 is arranged so that debris is not retained within the first chamber 124 on the inside of the lid 110 when the filter system 102 is being dumped out at the air intake aperture 112. The tank 104 may include four sides 106 and a base 108. The air intake aperture 112 may include an edge wall 178 that is adjacent three of the four sides 106 of the tank 104. The edge wall 178 may also be adjacent the pre-filter 116. As a result of the proximity of the edge wall 178 to the sides 106 and the pre-filter 116, debris can slide along or near the sides 106 or the pre-filter 116 when being dumped out and still easily exit through the air intake aperture 112. In some arrangements not herein depicted, the edge wall 178 may only be adjacent to one or two of the sides 106. Moreover, the edge wall 178 may not be adjacent the pre-filter 116 in some arrangements not herein depicted. The edge wall 178 may be slanted or may have another shape to facilitate removal of debris.

As shown in FIG. 8, the first chamber 124 includes a circumferential edge 190 that forms the upper boundary of the first chamber 124. A portion of the circumferential edge 190 is formed by at least one of the four sides 106 of the tank 104 or the pre-filter 116. In FIG. 8, the circumferential edge 190 is formed by three of the four sides 106 and the pre-filter 116. When the lid 110 is placed on the tank 104, the edge wall 178 extends along at least a portion of the circumferential edge 190. The portion of the circumferential edge 190 may be formed at least by the pre-filter 116, and the edge wall 178 may extend along the width of the pre-filter 116. In FIG. 8, if the lid 110 were placed on the tank 104, the edge wall 178 would extend along the entirety of the circumferential edge 190 including along three of the four sides 106 of tank 104 and along the pre-filter 116.

Figure 9:
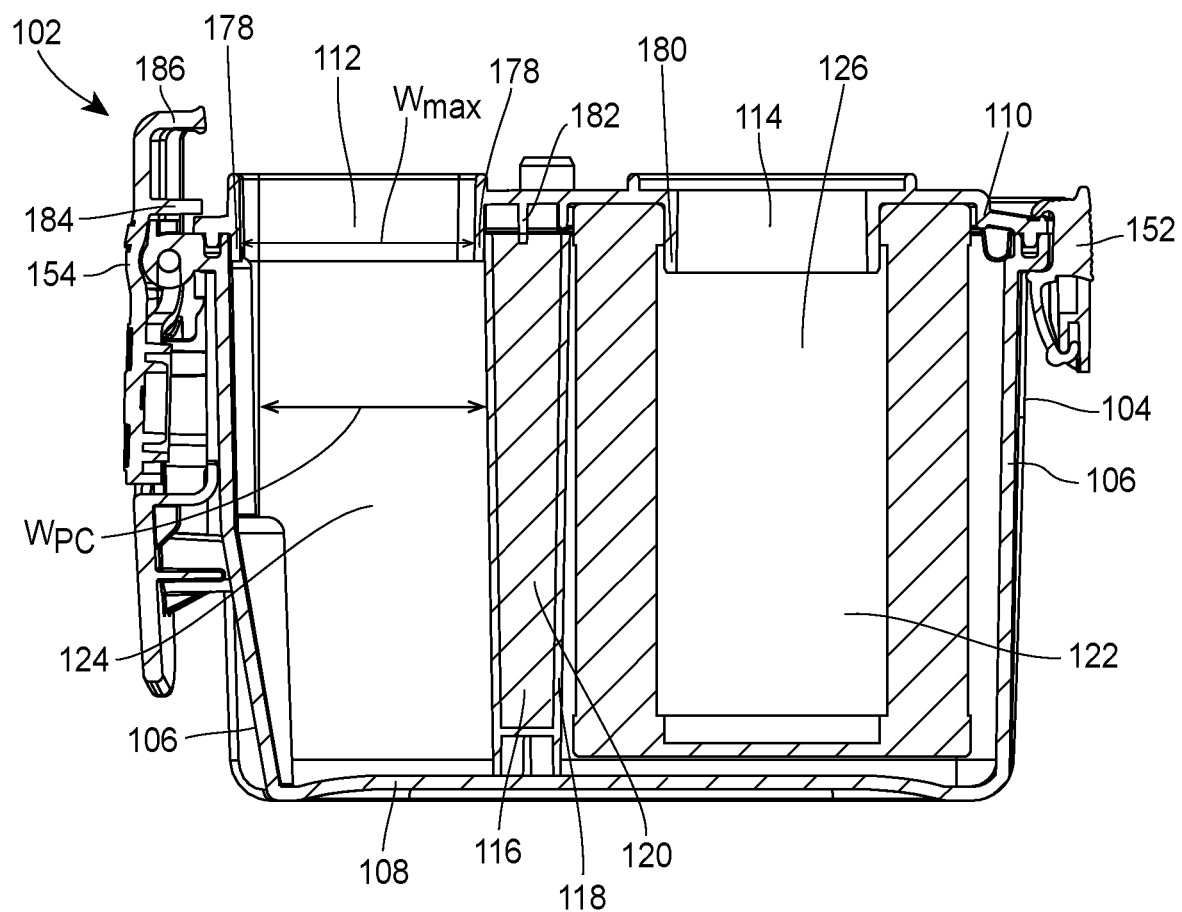
FIG. 9 is a cross-sectional side view of the filter system taken along the line B-B of FIG. 7 with the lid secured to the tank.

As best shown in FIG. 9, the air exhaust aperture 114 may be provided in the lid 110. The air exhaust aperture 114 includes a boundary wall 180 adjacent the cartridge filter 122. The boundary wall 180 helps to secure the cartridge filter 122 in place.

Also shown in FIG. 9 is an interference rib 182 of the lid 110. The interference rib 182 is inserted into the filter panel 120 when the pre-filter 116 is in place in the tank 104 and the lid 110 is closed. The interference rib 182 contacts the filter panel 120 along the entire width WP of the filter panel 120 when the lid 110 is closed. The interference rib 182 prevents dirty air from passing over the pre-filter 116 between the first chamber 124 and the second chamber 126. Accordingly, the interference rib 182 ensures that more debris is successfully removed from the dirty air during passage of the air through the filter system 102.

Figure 11A:
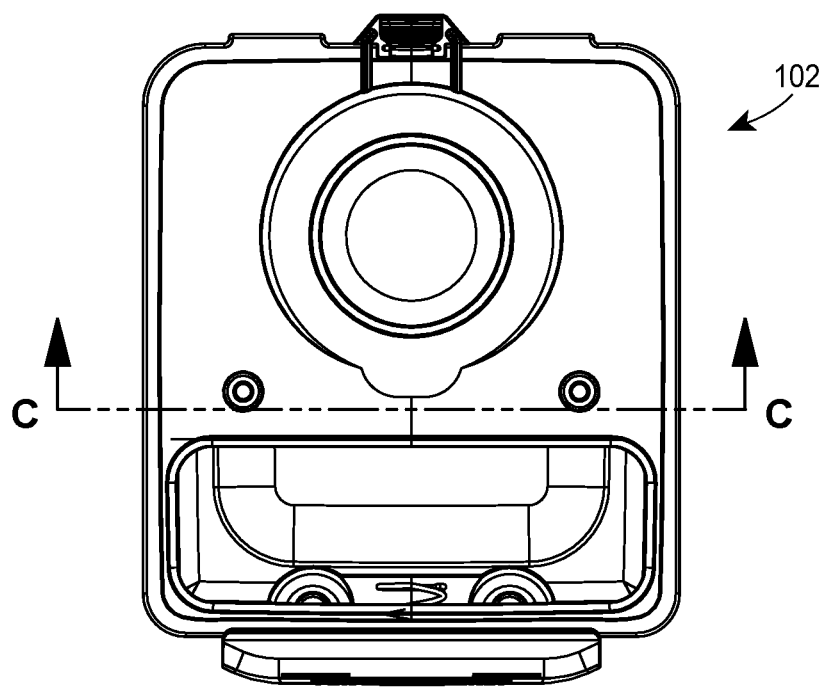
FIG. 11A is a top view of the filter system of FIG. 7 with an interference rib extending from the surface of the lid and the frame of the pre-filter.
Figure 11B:
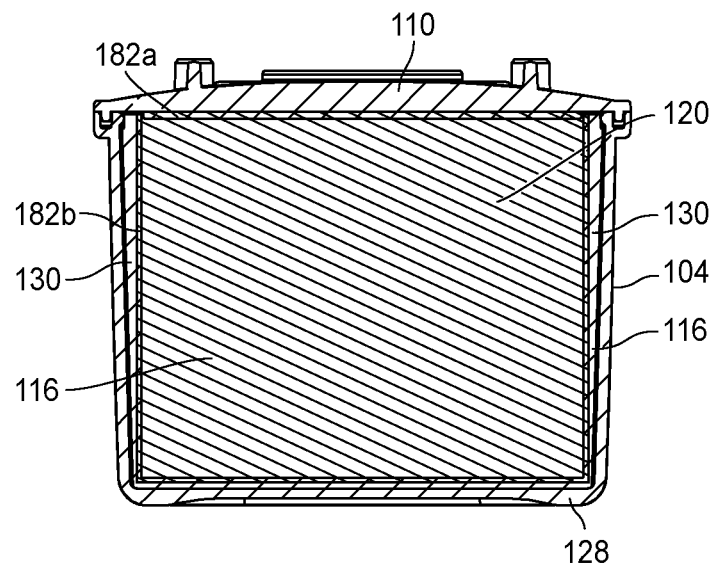
FIG. 11B is a cross-sectional side view of the filter system taken along C-C of FIG. 11A.

Referring now to FIGS. 11A and 11B, in some arrangements, the interference rib 182 may have two parts: an interference rib portion 182a extending from the lid 110 and an interference rib portion 182b extending from the sides 130 and/or the base 128 of the frame 118 of the pre-filter 116. Together, interference rib portions 182a and 182b may extend around some or all of the filter panel 120. In FIG. 11B, interference rib portions 182a and 182b extend around all of the filter panel 120 from both the sides 130 and the base 128. The interference rib 182, including interference rib portions 182a and 182b, secures the filter panel 120 within the frame 118 by being inserted into the filter panel 120 and prevents dirty air from bypassing the pre-filter 116 between the first chamber 124 and the second chamber 126.

Figure 12:
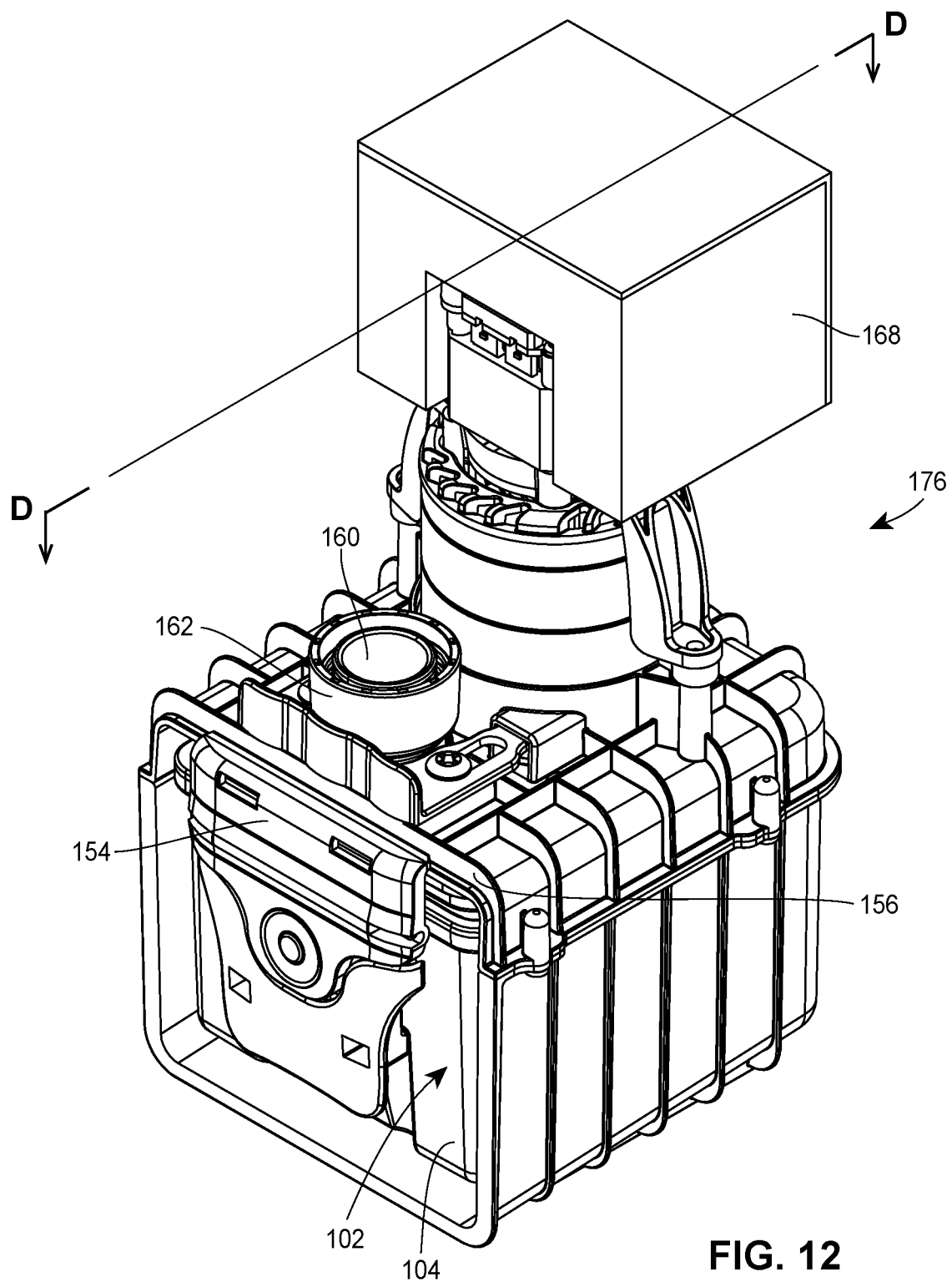
FIG. 12 is a top isometric view of a vacuum cleaner system incorporating the filter system of FIGS. 6-9.
Figure 13:
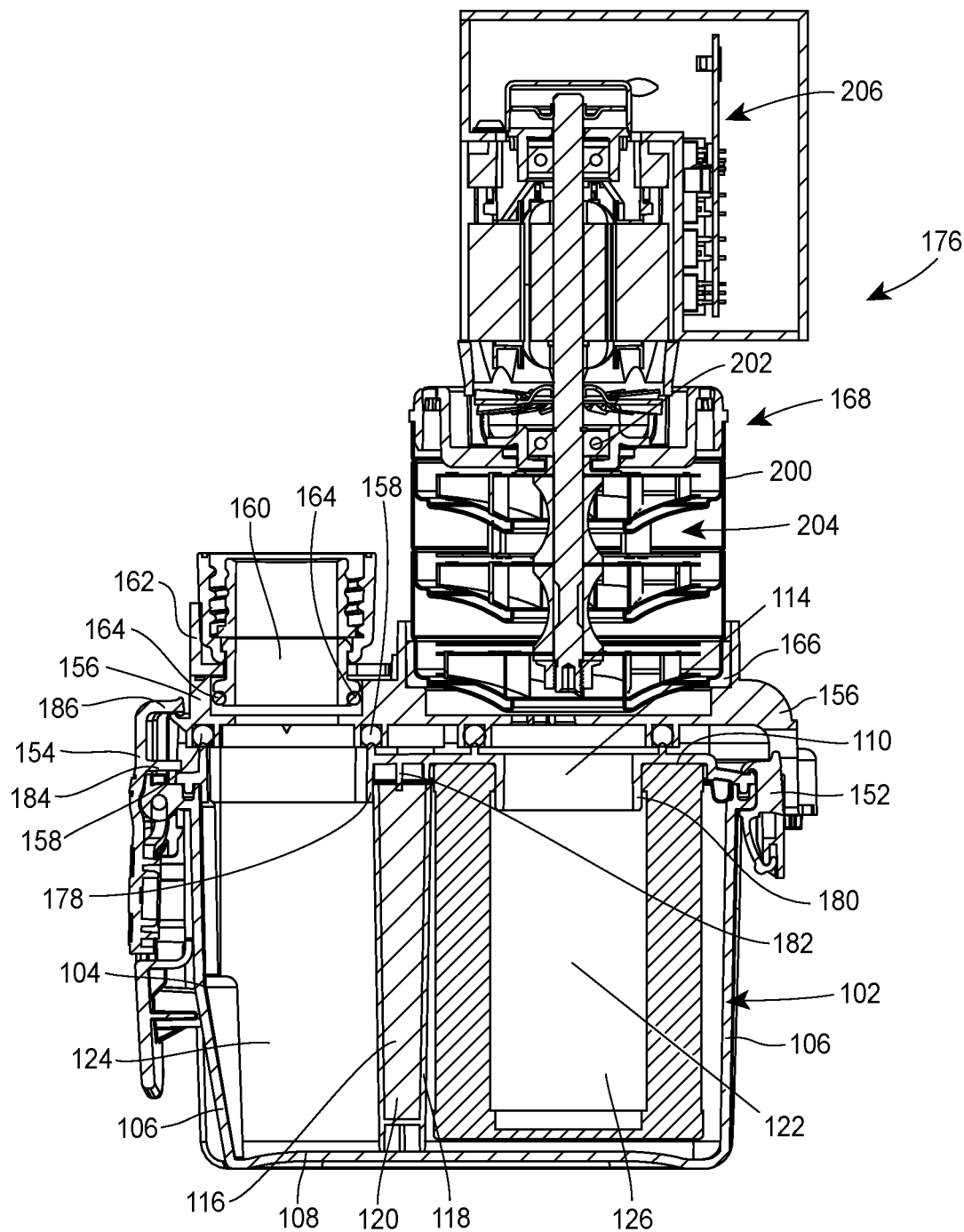
FIG. 13 is a cross-sectional side view of the vacuum cleaner system taken along the line D-D of FIG. 12.

FIGS. 12 and 13 depict a vacuum cleaner system 176 including the filter system 102 as described above and a support structure 156. The support structure 156 covers the tank 104. The lid 110 includes a lid latch 152 connectable to one of the sides of the tank 104, as shown in FIG. 13. The lid latch 152 enables the lid 110 to be secured to the tank 104 in a closed configuration. Although referred to as a latch, the lid latch 152 may be any reversible connection between the lid 110 and the tank 104, such as a hook, clasp, fastener, magnet, or other connection device known in the art. A release lever 154 is also connected to the tank 104, as shown in FIG. 13. Like the lid latch 152, the release lever 154 secures the lid 110 to the tank 104. The release lever 154 also secures the filter system 102 to the support structure 156, and optionally, to other parts of a vacuum cleaner system 176 via the support structure 156. For example, as shown in FIGS. 12 and 13, the support structure 156 is connected to a motor/impeller unit 168 in addition to being connected to the filter system 102.

As shown in FIG. 13, the motor/impeller unit 168 of the vacuum cleaner system 176 is contained within a motor housing 200. The motor housing 200 may take many different forms and shapes and sizes and still fall within the scope of the present disclosure. The motor/impeller unit 168 includes a motor 202 that drives an impeller assembly 204, and a controller 206 that controls the motor 202. The motor 202 can be of any design suitable for vacuum cleaners, including standard motors with brushes or brushless motors, and switched reluctance motors. The impeller assembly 204 may take any form suitable for moving air in a manner that will create a vacuum. In this arrangement, the impeller assembly 204 includes three in-line impellers. However, other forms of the impeller assembly 204 may also be used. The motor 202 is operatively coupled to the impeller assembly 204 to drive the impellers to create a vacuum. The controller 206 includes suitable electronics, such as a PCB board and/or other appropriate electronic control circuits configured to control the motor 202.

As shown in FIG. 13, the release lever 154 includes a first prong 184 configured to engage the lid 110 of the tank 104 and a second prong 186 configured to engage the support structure 156. The release lever 154 may be connected to the tank 104 by a hinge. Alternately, the release lever 154 may be screwed, fastened, or press fit onto the tank 104, or joined to the tank 104 in a removable manner in any way commonly known in the art. The first prong 184 and the second prong 186 may take any shape that facilitates connecting the release lever 154 to the lid 110 and the support structure 156, respectively. For example, the first prong 184 and/or the second prong 186 may be configured to be screwed, fastened, or press fit onto the lid 110 and/or the support structure 156. Alternately, the release lever 154 may have a geometric shape whereby the mere rotation of the release lever 154 aligns the first prong 184 and the second prong 186 with surfaces of the lid 110 and the support structure 156 such that the lid 110 and support structure 156 are secured in place. As yet another option, the first prong 184 or the second prong 186 may have multiple arms for gripping, may include adhesive, or may otherwise be configured to secure the lid 110 and the support structure 156 in place.

In order to prevent air flow leakage and/or to better connect various components of the vacuum cleaning system 176, various locking and sealing structures and materials may be incorporated into the vacuum cleaning system 176. Specifically, as shown in FIG. 13, the vacuum cleaning system 176 may include a worm gasket 158 in contact with the support structure 156 and the lid 110. The combination of the edge wall 178 and the worm gasket 158 help make it possible to empty the vacuum cleaning system 178 without removing the lid 110. The vacuum cleaner system 176 includes a hose lock 162 connected to the support structure 156, and a hose 160 connected to the hose lock 162. The hose 160 is in fluid communication with the first chamber 124. An o-ring 164 is in contact with the support structure 156 and the hose 160.

Figure 10:
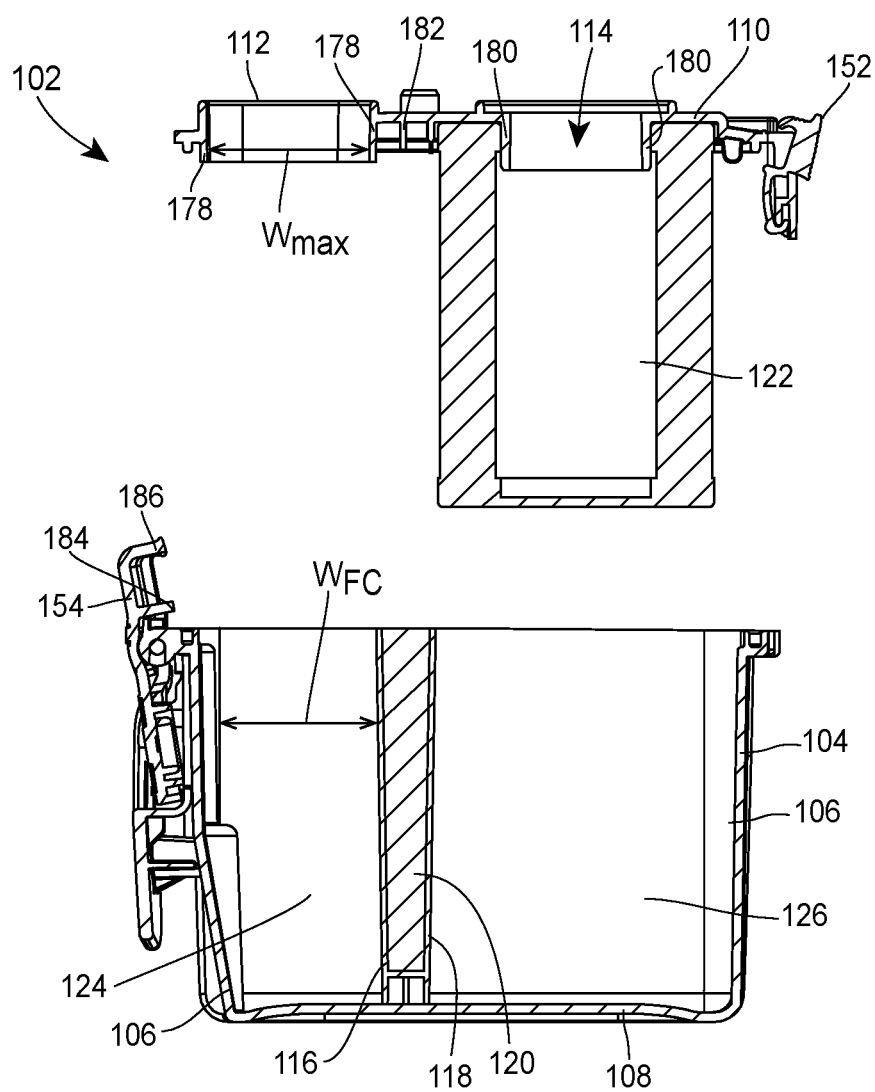
FIG. 10 is a cross-sectional side view of the filter system taken along the line B-B of FIG. 6 with the lid and cartridge filter removed from within the tank.
Figure 14:
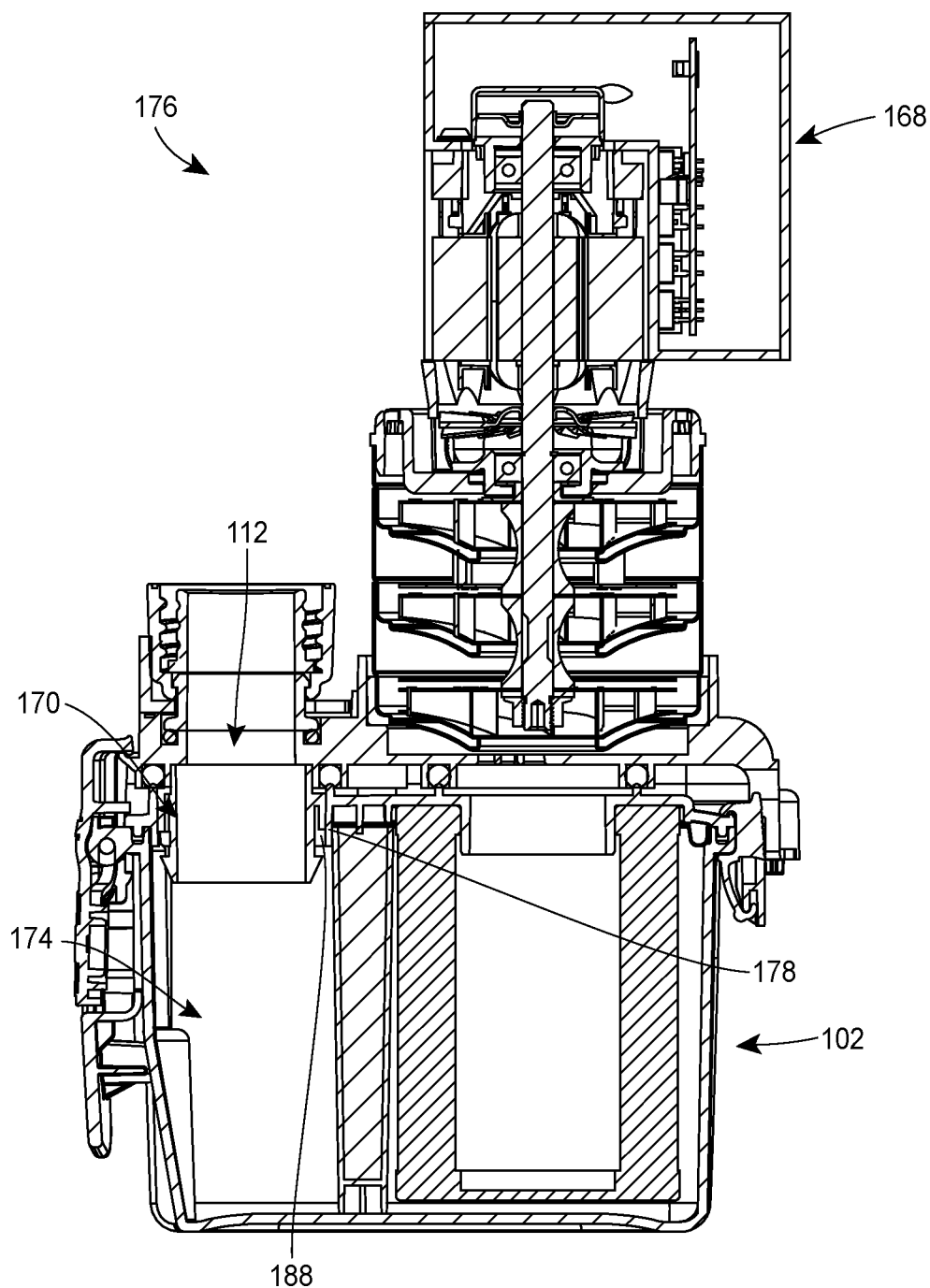
FIG. 14 is a cross-sectional side view of the vacuum cleaner system taken along the line D-D of FIG. 12 and including a bag.
Figure 15:
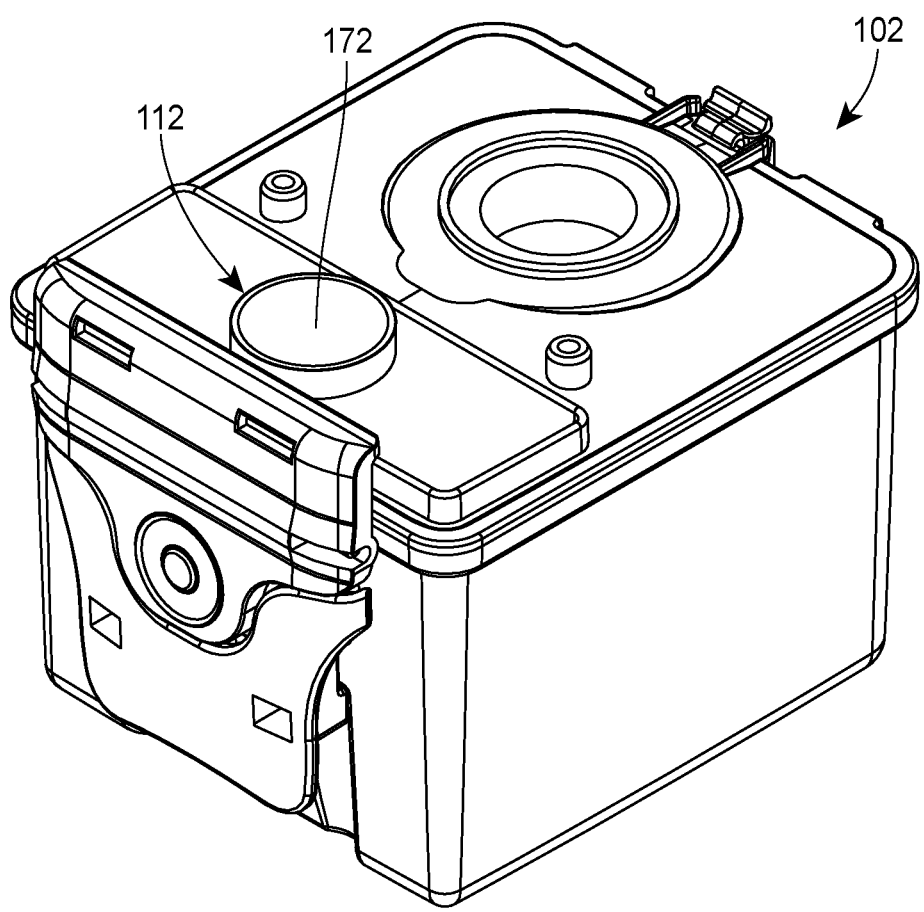
FIG. 15 is a top isometric view of the filter system of the vacuum cleaner system of FIGS. 10-12, the filter system including a bag.

FIGS. 14 and 15 depict the vacuum cleaner system 176 shown in FIGS. 10 and 12 configured to include a bag 174. The bag 174 is secured to a bag mount 170, as shown in FIG. 14. As shown in FIG. 15, the bag mount 170 is placed adjacent the air intake aperture 112. Specifically, as shown in FIG. 14, the bag mount 170 is placed through the air intake aperture 112 and secured against the edge wall 178 of the air intake aperture 112. In the arrangement shown in FIG. 14, the bag mount 170 includes a spring element 188 that is compressed to fit through the air intake aperture 112 and then expands to press against the edge wall 178 of the dirt air intake aperture 112. In other arrangements, the bag mount 170 may be secured in place via a hook, a ledge, a fastener, or any other suitable connection.

In view of the foregoing, it will be understood that the pre-filters 16 and 116, the vacuum filter systems 2 and 102, and the vacuum cleaner system 60, 176 of the present disclosure have several advantages over conventional vacuum cleaner filtering systems. For example, the pre-filters 16 and 116 allow the filter panel 20, 120 to be easily inserted and removed from the frame 18, 118 by optimally sizing the filter panel 20, 120 relative to the frame 18, 118. The frame 18, 118 is configured to be securely and easily placed within a tank 4, 104 via unique features such as slanted surfaces 38, 40, projection 42 and curvature 44, and/or ribs 48. The pre-filters 16 and 116 reduce the amount of debris reaching cartridge filters 22 and 122, thereby increasing the number of times that the cartridge filters 22 and 122 can be used before needing to be replaced.

In addition, the relatively large air intake aperture 112, in conjunction with division of the tank 104 into a first chamber 124 and a second chamber 126 by pre-filter 116, allows debris to be dumped from tank 104 without opening or removing the entire lid 110, thereby simplifying the emptying of the filter 102 for the user. The release lever 154 serves a dual function by securing both the lid 110 and the support structure 156 to the tank 104, reducing the number of components necessary to hold the vacuum cleaner system 176 together.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one example" or "an example" means that a particular element, feature, structure, or characteristic described in connection with the embodiment is included in at least one embodiment. The appearances of the phrase "in one example" in various places in the specification are not necessarily all referring to the same example.

Some examples may be described using the expression "coupled" and "connected" along with their derivatives. For example, some examples may be described using the term "coupled" to indicate that two or more elements are in direct physical or electrical contact. The term "coupled," however, may also mean that two or more elements are not in direct contact with each other, but yet still cooperate or interact with each other. The examples are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

While various embodiments have been described herein, it is understood that the appended claims are not intended to be limited thereto, and may include variations that are still within the literal or equivalent scope of the claims.

What is claimed is:

1. A vacuum cleaner system configured to be mounted to a vehicle comprising:
    a tank having an air intake aperture and an air exhaust aperture;
    a pre-filter including a frame and a filter panel, the pre-filter disposed in the tank and dividing the tank into a first chamber having the air intake aperture and a second chamber having the air exhaust aperture,
    the frame including a base, two sides connected to the base, a top portion having a width and a depth, a plurality of vertical struts connected to the base and to the top portion, and a plurality of air flow openings, the plurality of vertical struts and the plurality of air flow openings arranged vertically across the base from one of the two sides to the other of the two sides, at least one air flow opening of the plurality of air flow openings having a height, and
    the filter panel having a width less than or equal to the width of the top portion of the frame at least during insertion of the filter panel into the frame, a depth less than or equal to the depth of the top portion of the frame at least during insertion of the filter panel into the frame, and a height equal to or greater than the height of the at least one air flow opening.

2. The vacuum cleaner system of claim 1, wherein:
    the tank includes four sides, a bottom, and a lid connectable to one or more of the four sides, and
    at least one of the four sides of the tank, the bottom of the tank, the lid of the tank, or a combination thereof includes a first geometry, and wherein at least one of the two sides of the frame includes a second geometry that is complementary to the first geometry.

3. The vacuum cleaner system of claim 2, wherein the first geometry is a slanted surface of one of the four sides of the tank at a first angle relative to the bottom of the tank, and wherein the second geometry is a slanted surface of one of the two sides of the frame at a second angle relative to the bottom of the tank, wherein the first angle is identical to the second angle.

4. The vacuum cleaner system of claim 2, wherein the first geometry is a projection on one of the four sides of the tank, and wherein the second geometry is a curvature on one of the two sides of the frame that is complementary to the projection.

5. The vacuum cleaner system of claim 1, wherein the tank includes a lid having a recess, and wherein the width of the top portion is equal to or less than a width of the recess of the lid of the tank.

6. The vacuum cleaner system of claim 5, wherein a distance between the two sides is greater than the width of the top portion.

7. The vacuum cleaner system of claim 1 further comprising a cartridge filter covering the air exhaust aperture.

8. The vacuum cleaner system of claim 1, wherein ribs are provided on the tank to be adjacent to at least one of the two sides of the frame for purposes of locating the frame within the tank.

9. A pre-filter for a filter system of a vacuum cleaner system configured to be mounted in a vehicle, the pre-filter comprising:
    a frame including a base, two sides connected to the base, a top portion having a width and a depth, a plurality of vertical struts connected to the base and to the top portion, and a plurality of air flow openings, the plurality of vertical struts and the plurality of air flow openings arranged vertically across the base from one of the two sides to the other of the two sides, at least one air flow opening of the plurality of air flow openings having a height; and a filter panel having a width less than or equal to the width of the top portion of the frame at least during insertion of the filter panel into the frame, a depth less than or equal to the depth of the top portion of the frame at least during insertion of the filter panel into the frame, and a height equal to or greater than the height of the at least one air flow opening.

10. The pre-filter of claim 9, wherein the filter panel comprises reticulated foam.

11. The pre-filter of claim 9, wherein the frame includes two air flow openings.

12. The pre-filter of claim 9,
wherein at least one of the plurality of struts is trapezoidal, and
wherein the plurality of air flow openings are trapezoidal.

13. The pre-filter of claim 12,
wherein the at least one of the plurality of struts that is trapezoidal has the shape of an isosceles trapezoid, and
wherein the plurality of air flow openings that are trapezoidal have the shape of an isosceles trapezoid.

14. The pre-filter of claim 9, wherein the base of the frame has a first depth when adjacent to one of the plurality of air flow openings and a second depth when adjacent to one of the plurality of struts, and wherein the first depth is less than the second depth.

15. The pre-filter of claim 9, wherein each of the plurality of air flow openings is identical.

16. The pre-filter of claim 9, wherein one or more of the vertical struts is connected to the sides of the frame.

17. The pre-filter of claim 16, wherein one or more of the vertical struts is connected only to the base and to the top portion.

18. The pre-filter of claim 17, wherein the one or more of the vertical struts connected to the sides have a different shape than the one or more of the vertical struts connected only to the base and to the top portion.

19. The pre-filter of claim 9, wherein the filter panel has rectangular sides adjacent to the plurality of struts.

20. The pre-filter of claim 9, wherein each vertical strut of the plurality of vertical struts is aligned with another vertical strut of the plurality of vertical struts across the base that has the same shape.

21. A vacuum cleaner system comprising:
a tank, the tank including a lid, an air intake aperture provided in the lid of the tank, the air intake aperture having a width and a depth, and an air exhaust aperture provided in the tank; and
a filter system having a pre-filter including a frame and a filter panel, the pre-filter dividing the tank into a first chamber having the air intake aperture and a second chamber having the air exhaust aperture, the first chamber having a width and a depth such that the maximum width of the air intake aperture is at least 75% of the width of the first chamber and the maximum depth of the air intake aperture is at least 75% the depth of the first chamber.

22. The vacuum cleaner system of claim 21,
wherein the tank includes four sides and a bottom; and
wherein the air intake aperture includes an edge wall adjacent three of the four sides of the tank and adjacent the pre-filter.

23. The vacuum cleaner system of claim 21,
further comprising a cartridge filter covering the air exhaust aperture,
wherein the air exhaust aperture is provided in the lid and includes a boundary wall adjacent the cartridge filter.

24. The vacuum cleaner system of claim 21, wherein the filter system includes an interference rib extending from the lid that contacts the filter panel along the entire width of the filter panel when the lid is closed.

25. A vacuum cleaner system comprising:
a tank including sides, a lid including a lid latch connectable to one of the sides of the tank, an air intake aperture, and an air exhaust aperture;
a filter system having a pre-filter including a frame and a filter panel, the pre-filter dividing the tank into a first chamber having the air intake aperture and a second chamber having the air exhaust aperture;
a support structure coupled to the tank; and
a release lever connected to the tank, the release lever including a first prong configured to engage the lid of the tank and a second prong configured to engage the support structure, and
further comprising a worm gasket in contact with the support structure and the lid.

26. The vacuum cleaner system of claim 25,
wherein the air intake aperture has a maximum width that is at least 75% of the width of the first chamber and a maximum depth that is at least 75% the depth of the first chamber.

27. The vacuum cleaner system of claim 25, further comprising a bag mount connected to the tank adjacent the air intake aperture.

28. The vacuum cleaner system of claim 25, further comprising a motor/impeller unit connected to the support structure.

29. The vacuum cleaner system of claim 25, further comprising a cartridge filter covering the air exhaust aperture.

30. A vacuum cleaner system comprising:
a tank including sides, a lid including a lid latch connectable to one of the sides of the tank, an air intake aperture, and an air exhaust aperture;
a filter system having a pre-filter including a frame and a filter panel, the pre-filter dividing the tank into a first chamber having the air intake aperture and a second chamber having the air exhaust aperture;
a support structure coupled to the tank; and
a release lever connected to the tank, the release lever including a first prong configured to engage the lid of the tank and a second prong configured to engage the support structure, and
further comprising a hose lock connected to the support structure, and a hose connected to the hose lock, wherein the hose is in fluid communication with the first chamber.

31. The vacuum cleaner system of claim 30, further comprising an o-ring in contact with the support structure and the hose.

32. A vacuum cleaner system comprising:
a tank, the tank including sides, a lid, an air intake aperture provided in the lid of the tank, the air intake aperture having an edge wall, and an air exhaust aperture provided in the tank; and a filter system having a pre-filter including a frame and a filter panel, the pre-filter dividing the tank into a first chamber having the air intake aperture and a second chamber having the air exhaust aperture, the first chamber having a circumferential edge, a portion of the circumferential edge formed by at least one of the sides of the tank or the pre-filter, the edge wall of the air intake aperture extending along at least the portion of the circumferential edge of the first chamber formed by the at least one of the sides of the tank or the pre-filter, wherein the portion of the circumferential edge is formed at least by the pre-filter, and the edge wall of the air intake aperture extends along the pre-filter.

33. The vacuum cleaner system of claim 32, further comprising a support structure coupled to the tank and a worm gasket in contact with the support structure and the lid of the tank.

34. The vacuum cleaner system of claim 32, wherein the filter system includes an interference rib extending from the lid that contacts the filter panel along the entire width of the filter panel when the lid is closed.

35. The vacuum cleaner system of claim 34, wherein the interference rib further extends from one or more of a side or a base of the frame.

\* \* \* \* \*